(12) United States Patent
Donderici et al.

(10) Patent No.: US 10,955,579 B2
(45) Date of Patent: Mar. 23, 2021

(54) MEASUREMENT AND CONTROL APPARATUS, SYSTEMS, AND METHODS

(71) Applicant: Halliburton Energy Services, Inc., Houston, TX (US)

(72) Inventors: Burkay Donderici, Houston, TX (US); Baris Guner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 785 days.

(21) Appl. No.: 15/552,234

(22) PCT Filed: Feb. 10, 2016

(86) PCT No.: PCT/US2016/017363
§ 371 (c)(1),
(2) Date: Aug. 18, 2017

(87) PCT Pub. No.: WO2016/153617
PCT Pub. Date: Sep. 29, 2016

(65) Prior Publication Data
US 2018/0067225 A1 Mar. 8, 2018

Related U.S. Application Data

(60) Provisional application No. 62/135,994, filed on Mar. 20, 2015.

(51) Int. Cl.
*G01V 3/20* (2006.01)
*G01V 3/26* (2006.01)
(Continued)

(52) U.S. Cl.
CPC .............. *G01V 3/20* (2013.01); *E21B 47/085* (2020.05); *G01V 3/26* (2013.01); *G01V 3/38* (2013.01)

(58) Field of Classification Search
CPC ... G01V 3/20; G01V 3/26; G01V 3/38; E21N 47/085
(Continued)

(56) References Cited

U.S. PATENT DOCUMENTS 4,117,394 A * 9/1978 Souhaite .................. G01V 3/20
324/374
6,098,019 A * 8/2000 Hakvoort ................. G01V 3/20
324/339
(Continued)

FOREIGN PATENT DOCUMENTS

WO 2009039468 A1 3/2009
WO 2014011186 A1 1/2014
(Continued)

OTHER PUBLICATIONS

"International Application Serial No. PCT/US2016/017363, International Search Report dated May 31, 2016", 3 pgs.
(Continued)

*Primary Examiner* — John E Breene
*Assistant Examiner* — Xiuqin Sun
(74) *Attorney, Agent, or Firm* — Gilliam IP PLLC

(57) ABSTRACT

Apparatus, systems, and methods may operate to detect anomalous formation resistivity values within measured formation resistivity data, based on mud resistivity associated with a borehole in a geological formation, the measured formation resistivity data comprising the anomalous formation resistivity values and acceptable formation resistivity values. Additional activity may include transforming the anomalous formation resistivity values into corrected formation resistivity values, inverting the corrected formation resistivity values and the acceptable formation resistivity values to provide true resistivity values for a geological formation, and operating a controlled device according to
(Continued)

the true resistivity values for the geological formation. Additional apparatus, systems, and methods are disclosed.

19 Claims, 19 Drawing Sheets

(51) Int. Cl.
*G01V 3/38* (2006.01)
*E21B 47/085* (2012.01)
(58) Field of Classification Search
USPC .............................................................. 702/7
See application file for complete search history.

(56) References Cited

U.S. PATENT DOCUMENTS

| | | | |
|---|---|---|---|
| 6,381,542 B1 * | 4/2002 | Zhang | G01V 3/38 702/7 |
| 6,426,625 B1 | 7/2002 | Samworth et al. | |
| 7,888,941 B2 * | 2/2011 | San Martin | G01V 3/24 324/347 |
| 2003/0210061 A1 | 11/2003 | Fabris et al. | |
| 2005/0134279 A1 | 6/2005 | Hu et al. | |
| 2011/0199090 A1 | 8/2011 | Hayman | |
| 2015/0177406 A1 * | 6/2015 | Li | G01V 3/24 702/7 |

FOREIGN PATENT DOCUMENTS

| | | |
|---|---|---|
| WO | 2016137500 A1 | 9/2016 |
| WO | 2016153617 A1 | 9/2016 |

OTHER PUBLICATIONS

"International Application Serial No. PCT/US2016/017363, Written Opinion dated May 31, 2016", 11 pgs.

* cited by examiner

US 10,955,579 B2

MEASUREMENT AND CONTROL APPARATUS, SYSTEMS, AND METHODS

PRIORITY APPLICATION

This application claims the benefit of priority to U.S. Provisional Application Serial No. 62/135,994, filed on Mar. 20, 2015 which application is incorporated by reference herein in its entirety.

BACKGROUND

Understanding the structure and properties of geological formations often reduces the cost of drilling wells for oil and gas exploration. Measurements are typically performed in a borehole (i.e., downhole measurements) in order to attain this understanding. To obtain such measurements, a variety of sensors and mounting configurations may be used.

For example, resistivity tools are widely used in oil field exploration applications for determining zones in a formation that may contain hydrocarbons. Accurate determination of the formation resistivity is useful in assessing the feasibility of production for a particular well. However, resistivity measured by the tool is often affected by factors other than the formation resistivity. For example, the presence of the borehole itself, as well as invasion zones, may change the measurement values. In addition, caving may contribute to rugosity or eccentricity, distorting shallow resistivity measurements.

DETAILED DESCRIPTION

Introduction to Various Embodiments

To address some of these challenges, as well as others, apparatus, systems, and methods are described herein that improve resistivity measurement accuracy in a formation, such as when caving effects are present. In some embodiments, this is the result of implementing a novel approach for performing data correction as a part of 1D radial inversions of the measured resistivity data. In this way, array type resistivity tools can be used to obtain a radial resistivity profile and thereafter, formation and invasion properties can be more accurately determined using the inversion methods described herein.

To begin to understand the problem, it is noted that array type resistivity tools often have different modes of operation, associated with different depths of investigation. Data from these different modes are used to obtain a radial resistivity profile and hence, formation and invasion properties using inversion. Laterolog type tools are a useful subgroup of resistivity tools whose working principle is based on injecting current into the formation and estimating formation resistivity from the resulting voltage difference. Descriptions in this document will focus on array laterolog measurements, although the apparatus, systems, arid methods described can easily be extended to other array resistivity tools, including induction type tools.

In some cases, such as when there is caving or when the borehole is large, shallow measurement modes of an array laterolog tool may tend toward measuring characteristics of the mud fluid, instead of the formation. This reduced sensitivity to the formation is further exacerbated when the difference between formation resistivity (Rt) and mud resistivity (Rm) is relatively great. In such cases, measurements using shallow modes can differ significantly than those obtained using deeper modes. All such measurements may influence the values of associated borehole-corrected resistivities.

Figure 1:
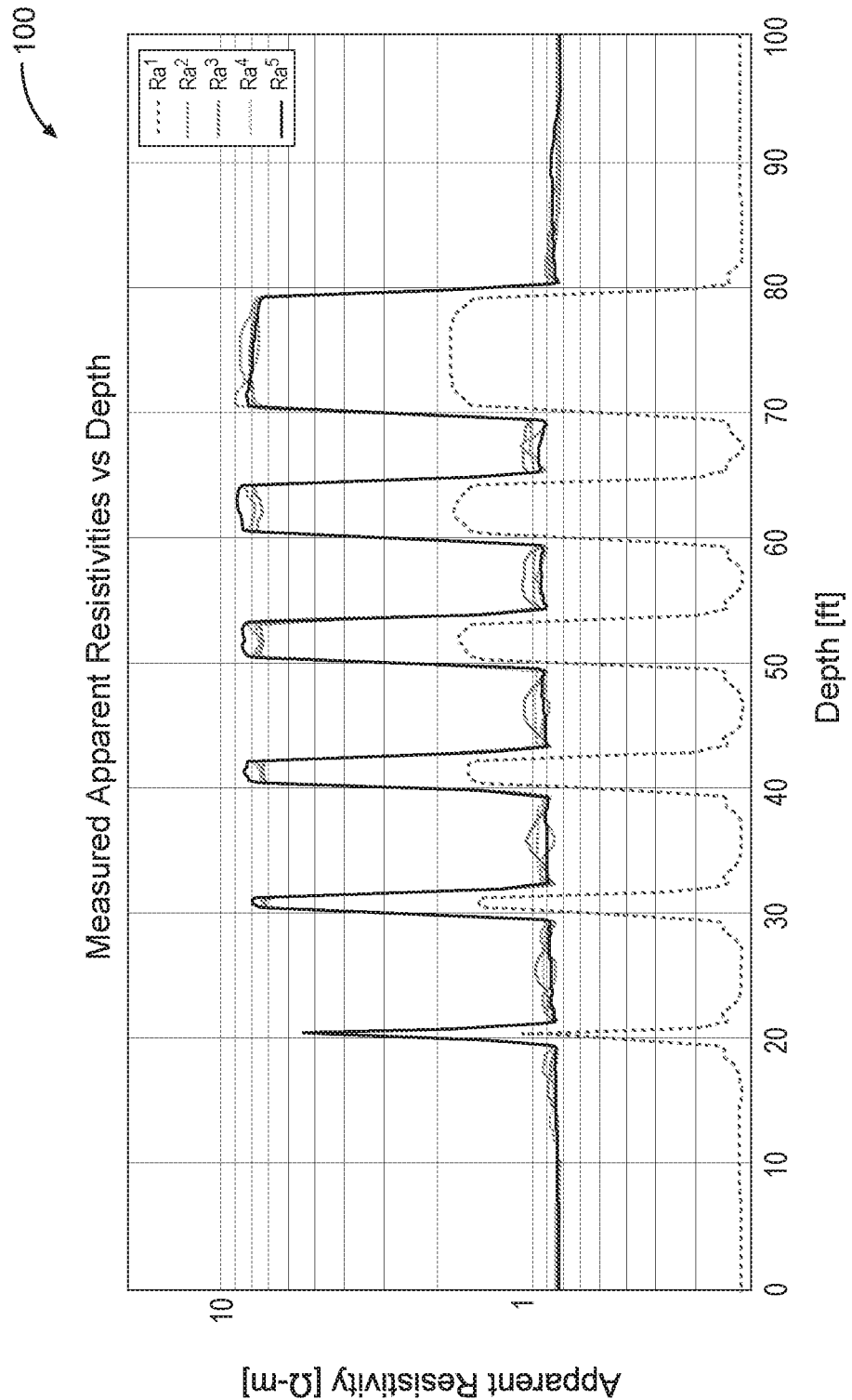
FIG. 1. is a graph of synthetic measured apparent resistivities where shallow mode results differ significantly from deeper mode results, according to various embodiments.

FIG. 1 is a graph 100 of synthetic measured apparent resistivities where shallow mode results differ significantly from deeper mode results, according to various embodiments. Here a synthetic example is given for a case where apparent resistivities Ra1-Ra5 (corresponding to modes 1 to 5) are measured by a laterolog tool. The graph 100 clearly shows problematic results for mode 1 (corresponding to Ra1), which may be considered as the shallowest mode of all available measurement modes. This is apparent to those of ordinary skill in the art, due to widely diverging measurement values of mode 1 (corresponding to Ra1), and modes 2-5 (corresponding to Ra2-Ra5). This resulting variation in value, over a range of almost 10:1, is not desirable, since it is difficult to interpret. It may lead the end user to be unsure as to whether the results for mode 1 are accurate, or erroneous.

In this document, apparatus, systems, and methods to detect and correct for the effects of caving or a large borehole on shallow resistivity readings are presented. Similar issues may arise when eccentricity is prominent. The apparatus, systems, and methods can be applied in any such case where shallow resistivity readings are deemed to be inaccurate. Thus, while such errors may have a number of causes, for convenience, all errors in shallow resistivity measurement will be deemed to arise from "caving effects" for the remainder of the description.

The benefits of this technical solution to the technical problem presented by caving effects include providing an ability to detect problems with shallow resistivity measurements, as well as the ability to automatically and successfully correct them. As a result, the technical solution described herein delivers more accurate measurements, provides more smoothly-regulated control systems, and produces resistivity logs that are easier for the end user to interpret.

Overview of Array Laterolog Tools

Array laterolog tools are employed to determine the electrical properties of a formation at different depths of investigation, which may be obtained by operating the tool using different excitation modes and applying a focusing algorithm to the measured data. These electrical properties may include resistivity measurements.

Figure 2:
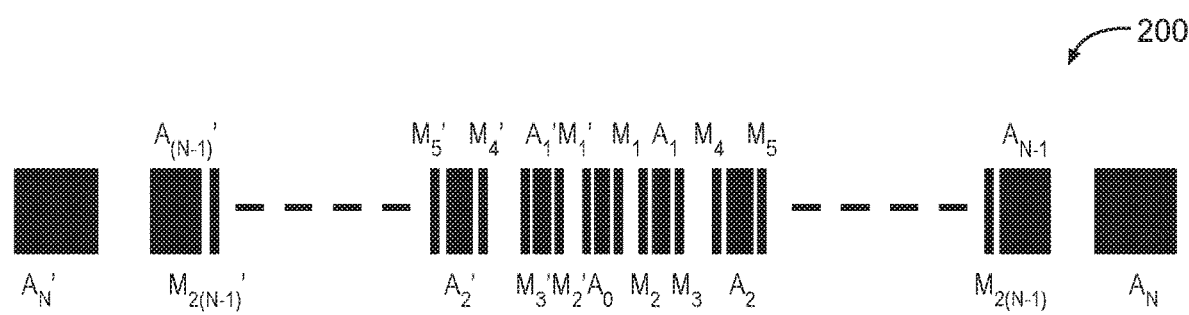
FIG. 2 is a block diagram of a laterolog array tool that can be operated in accordance with various embodiments.

FIG. 2 is a block diagram of a laterolog array tool 200 that can be operated in accordance with various embodiments. Here, the survey electrode is denoted by the label $A_0$. There are a total of 2N guard electrodes $(A_1, A_1', \ldots, A_N, A_N')$ and 4N-4 monitor electrodes $(M_1, M_1', M_2, M_2', \ldots, M_{2(N-1)}, M_{2(N-1)}')$. Array laterolog tools are generally operated such that voltages at (or voltage differences between) monitor electrodes are measured as a function of the current emitted from different combinations of guard electrodes. As an example, the tool 200 may provide N excitation modes, as noted in Equation (1):

$$\text{Excitation Mode 1: } I_{A_0} = 1 \text{ Amperes;} \quad \text{Equation (1)}$$
$$I_{Ai} + I'_{Ai} = 0, i = 1, \ldots, N-1$$
$$\text{Excitation Mode 2: } I_{A_1} + I'_{A_1} = 1 \text{ Amperes;}$$
$$I_{A_0} = 0; I_{Ai} + I'_{Ai} = 0,$$
$$i = 2, \ldots, N-1$$
$$\vdots$$
$$\text{Excitation Mode N: } I_{A_{N-1}} + I'_{A_{N-1}} = 1 \text{ Amperes;}$$
$$I_{A_0} = 0; I_{Ai} + I'_{Ai} = 0,$$
$$i = 1, \ldots, N-2$$

where $I_{Ai}$ denotes the current emitted from electrode $A_i$. In all these excitation modes, currents are returned to current electrodes $A_N$ and $A_N'$.

Focusing algorithms use the principle of superposition in order to combine measurements from different excitation modes, providing a result that is equivalent to forcing the current emitted from the survey electrode to travel in a narrow path close to the survey electrode. This is accomplished by setting the potential difference between monitor electrode pairs to zero, preventing the flow of current in that direction, Furthermore, emitted current may be directed to return to different guard electrodes at different distances with respect to the survey electrode. Since the depth of investigation is proportional to the separation between the electrode emitting current and the return electrode, different linear combinations of excitation modes can be employed to make measurements at different depths of investigation. Software focusing is described herein, although some embodiments utilize hardware focusing, or a combination of hardware and software focusing.

It should be noted that while a laterolog array is used in the various examples that follow, this is done as a matter of convenience, and the various embodiments are not to be so limited. Thus, the methods described herein can be applied to radial 1D inversions of measurements made by a variety of tools, including array induction tools, among others.

Figure 3:
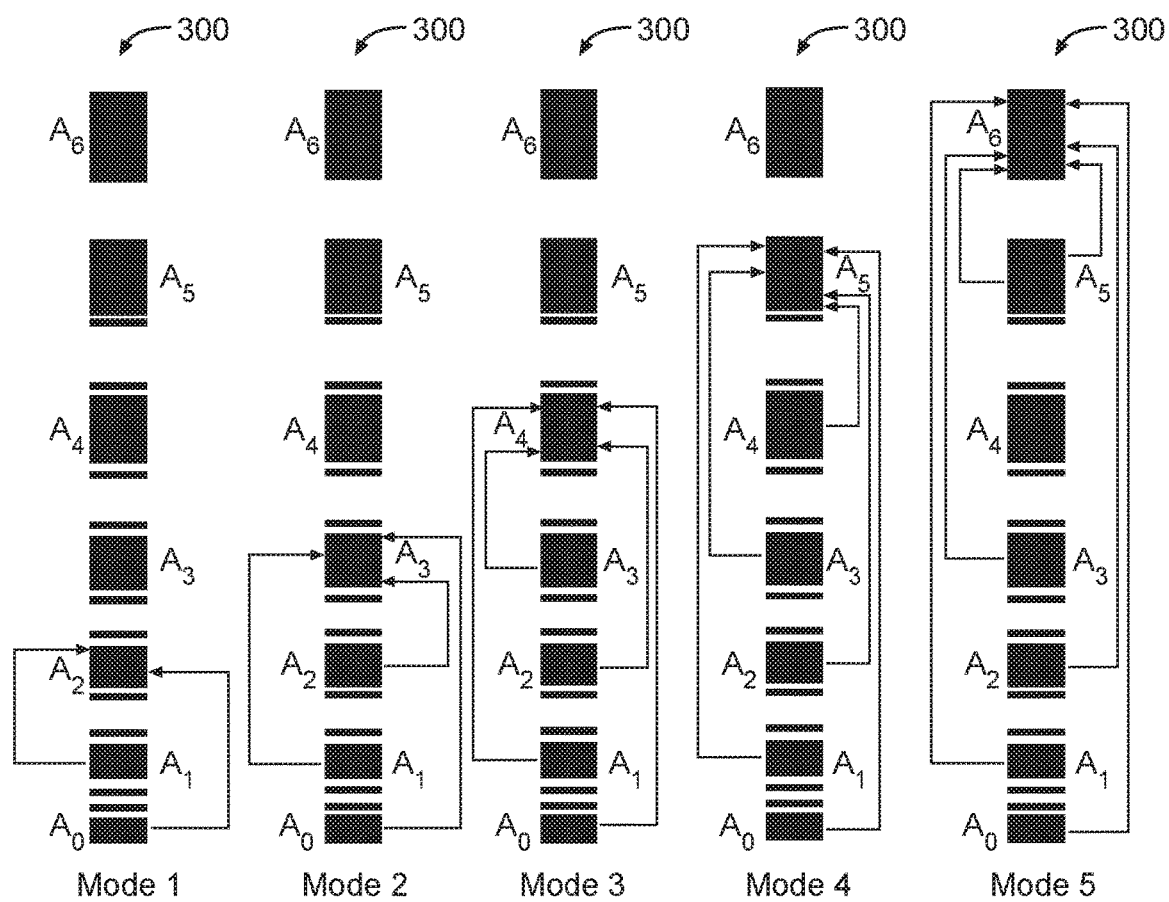
FIG. 3 illustrates operational modes of the laterolog array tool shown in FIG. 2.

FIG. 3 illustrates operational modes of the laterolog array shown in FIG. 2, The operational Modes : 1-5 are obtained as a result of focusing the elements of the array 300 are depicted in the figure, where only one half of the laterolog tool is shown for simplicity. That is, the primed electrodes are not shown in FIG. 3.

It is also noted that the tool 300 depicted in FIG. 3 is a special case of the tool 200 shown in FIG. 2, with N=6. Going forward, this specific configuration (i.e., N=6) will be used to provide examples of use for various method embodiments, and the operational Modes 1 to 5 (i.e., N−1) for the tool 300 will now be described.

In Mode 1, currents from $A_0$, $A_1$, and $A_1'$ return to $A_2$ and $A_2'$. To accomplish focusing in this mode, the voltage difference of $(VM_1+VM_1')-(VM_2+VM_2')$ is set to 0.

In Mode 2, currents from $A_0$, $A_1$, $A_1'$, $A_2$, and $A_2'$ return to $A_3$ and $A_3'$. To accomplish focusing in this mode, the voltage differences of $(VM_1+VM_1')-(VM_2+VM_2')$ and $(VM_3+VM_3')-(VM_4+VM_4')$ are set to 0.

In Mode 3, currents from $A_0$, $A_1$, $A_1'$, $A_2$, $A_2'$, $A_3$, and $A_3'$ return to $A_4$ and $A_4'$. To accomplish focusing in this mode, the voltage differences of $(VM_1+VM_1')-(VM_2+VM_2')$, $(VM_3+VM_3')-(VM_4+VM_4')$ and $(VM_5+VM_5')-(VM_6+VM_6')$ are set to 0.

In Mode 4, currents from $A_0$, $A_1$, $A_1'$, $A_2$, $A_2'$, $A_3$, $A_3'$, $A_4$, and $A_4'$ return to $A_5$ and $A_5'$. To accomplish focusing in this mode, the voltage differences of $(VM_1+VM_1')-(VM_2+VM_2')$, $(VM_3+VM_3')-(VM_4+VM_4')$, $(VM_5+VM_5')-(VM_6+VM_6')$ and $(VM_7+VM_7')-(VM_8+VM_8')$ are set to 0.

In Mode 5, currents from $A_0$, $A_1$, $A_1'$, $A_2$, $A_2'$, $A_3$, $A_3'$, $A_4$, $A_4'$, $A_5$, and $A_5'$ return to $A_6$ and $A_6'$. To accomplish focusing in this mode, the voltage differences of $(VM_1+VM_1')-(VM_2+VM_2')$, $(VM_3+VM_3')-(VM_4+VM_4')$, $(VM_5+VM_5')-(VM_6+VM_6')$, $(VM_7+VM_7')-(VM_8+VM_8')$ and $(VM_9+VM_9')-(VM_{10}+VM_{10}')$ are set to 0.

Thus, as the mode number increases, emitted currents propagate to return electrodes that are further away from the source, providing a deeper investigation of the formation.

An Example Method

As mentioned previously, a 1D formation model with invasion is commonly used in modeling resistivity tools, and in inverting the data obtained from such tools. The 1D model is simple and generally accurate, especially for thick beds. When this model is used, it is generally assumed that the invasion has a step profile, although other invasion profiles (e.g., linear) may be used in the inversion process as well. This type of assumption will be illustrated and described in the following paragraphs.

Figure 4:
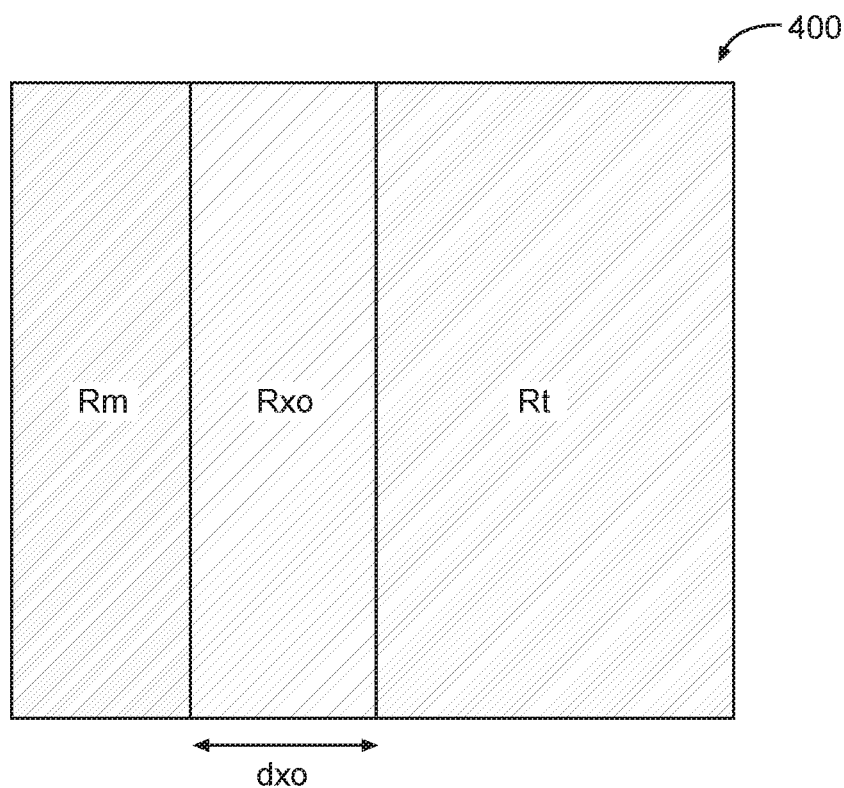
FIG. 4 is a side, cut-away view of a one-dimensional (1D) formation with a step invasion profile, according to various embodiments.

FIG. 4 is a side, cut-away view of a 1D formation 400 with a step invasion profile, according to various embodiments. The step invasion profile provides a constant invasion resistivity for a given invasion radius.

The inversion process involves taking the measured apparent resistivities provided by a resistivity tool, and matching them to the apparent resistivities generated by a forward model of the formation, using an assumed profile (e.g., the step invasion profile shown in FIG. 4). The forward model thus takes variables such as Rt (formation resistivity), Rm (mud resistivity), decc (eccentricity), Rxo (invasion resistivity), dxo (invasion radius), and caliper size values as inputs to produce an analytical estimate of Ra (apparent resistivity) that should be measured by the tool under those conditions.

As is known to those of ordinary skill in the art, a variety of techniques exist to perform numerical inversion, most of which are well-documented in the literature. The techniques described herein are applicable to any such method, including those that implement a table look-up or an iterative solution. Thus, for simplicity and ease of understanding, the following examples use of an iterative solution based on the well-known Levenberg-Marquardt algorithm.

Figure 5:
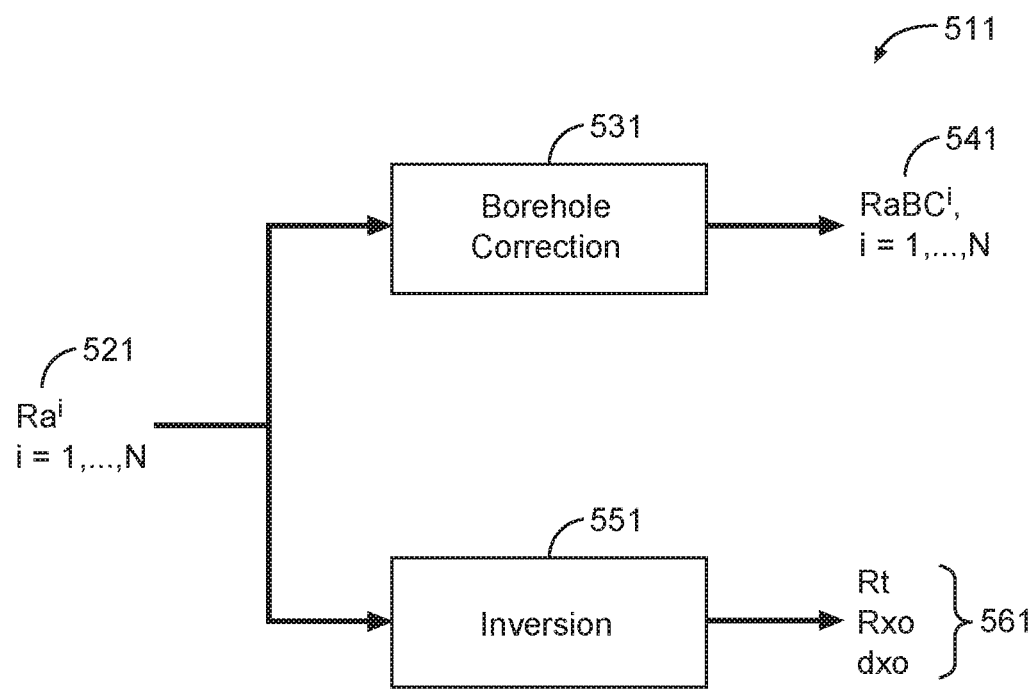
FIG. 5 is a flow diagram illustrating an inversion method, according to various embodiments.

FIG. 5 is a flow diagram illustrating an inversion method 511, according to various embodiments. Here, a summary of a conventional inversion process is given, where caliper and mud resistivity are assumed to be known, and the tool is assumed to be centered in the borehole. In other embodiments, these parameters can be inverted, as well.

In this case, the measured apparent resistivities ($Ra^1$ through $Ra^N$) 521 are passed through a borehole correction stage 531 to obtain borehole corrected apparent resistivities ($RaBC^1$ through $RaBC^N$) 541. The input apparent resistivities 521 are also submitted to inversion at block 551 to obtain the inversion results 561 of Rt, Rxo, and dxo.

Caving Correction

To correct for caving in some embodiments, two separate processes are combined. The first process is based on the observation that resistivity anomalies in shallow measurement modes tend to be prevalent when the contrast between Rt and Rm is great. Thus, in the first process, the apparent resistivity of the deepest mode is used as an indicator of true formation resistivity, with correction applied when large measurement differences (i.e., anomalies) occur. In some embodiments, thresholds are used to set the level of difference that is considered to constitute an "anomalous" measurement.

Note that many similar implementations exist and should be considered as a part of this invention, such as using the borehole corrected apparent resistivity of the deepest mode, using another deep mode (e.g., shallower than the deepest mode), performing an initial inversion and using the resulting formation resistivity estimate, or taking a formation resistivity estimate from measurements provided by another tool.

Pseudo-code for the first process (using an array laterolog tool with N modes of operation) is as follows:

If $Ra^N / RM < Threshlow^j$   Equation (2)

weightvec_1($i$) = 1

Else if $Ra^N / Rm > Threshhigh^i$ weightvec_1($i$) = 0 otherwise $$\text{weightvec\_1}(i) = \frac{\log(Threshhigh^i) - \log\left(\frac{Ra^N}{Rm}\right)}{\log(Threshhigh^i) - \log(Threshlow^j)}$$

In the pseudo-code of Equation (2), i refers to the operational mode number that is to be corrected. The variable weightvec_1 represents a vector, and weightvec_(i) denotes the correction weight for that particular mode. The process operates so that when the apparent resistivity of the deepest mode (scaled by Rm) is lower than a selected low threshold for that mode (Threshlow$^i$), the weight is set=1 (i.e., no correction.) If the apparent resistivity of the deepest mode is higher than a selected high threshold (Threshhigh$^i$), the weight is set=0. Otherwise, a weight is calculated based on a logarithmic transition between the two thresholds. Note that other transition functions (e.g., a linear transition) may also be applied. Not all modes may have correction applied. For example, in some embodiments, the deepest mode that is predicted to be affected by caving can be denoted by the letter K, where K is less than N. For modes deeper than mode K (i.e., i>K), weightvec_1 (i) can always be set=1.

For the example array laterolog tool shown in FIG. 3, with five operational modes, increasing mode numbers correspond to increasing depths of investigation. Correction is only applied for Modes i=1 and 2, correction weights for all other modes are set=1 (i.e., so that no correction is applied). For the particular tool under consideration, and for Mode 1, it was determined out that Threshlow$^1$ can be selected within a range between 100-2000, and Threshhigh$^1$ can be selected within a range between 300-10000. Trivially, Threshhigh$^1$ should also be larger than Threshlow$^1$. For Mode 2, an appropriate range for Threshlow$^2$ was determined to be between 5000 and 50000, while the appropriate range for Threshigh$^2$ is between 10000 and 200000.

Although this first process operates to detect caving effects in many cases, better performance and fine tuning may result when a second process is also implemented. This second process is based on the separation of the borehole corrected apparent resistivities.

Pseudo-code for the second process is shown in Equation (3), as follows:

If $\dfrac{|\min\{RaBC_C^j, j > i\} - RaBC^i|}{\max\{RaBC_C^j, j > i\} - \min\{RaBC_C^j, j > i\}} < Septhreshlow^j$   Equation (3)

weightvec_2($i$) = 1

Else if $\dfrac{|\min\{RaBC_C^j, j > i\} - RaBC^i|}{\max\{RaBC_C^j, j > i\} - \min\{RaBC_C^j, j > i\}} > Septhreshhigh^i$ weightvec_2($i$) = 0 otherwise $$\text{weightvec\_2}(i) = \frac{\log(Septhreshhigh^i) - \log\left(\dfrac{|\min\{RaBC_C^j, j > i\} - RaBC^i|}{\max\{RaBC_C^j, j > i\} - \min\{RaBC_C^j, j > i\}}\right)}{\log(Septhreshhigh^i) - \log(Septhreshlow^j)}$$

In equation (3), the difference between borehole-corrected apparent resistivity of mode i and the minimum apparent resistivity of all the modes deeper than i is determined. The maximum separation between apparent resistivities of all modes deeper than mode i is also determined. The ratio of these two quantities is taken, and compared with selected thresholds (i.e., Septhreshlow$^i$ and Septhreshhigh$^i$), similar to what occurred in the process of Equation (2). Appropriate values of Septhreshlow$^i$ and Septhreshhigh$^o$ range between 1.5 to 15. As a result of applying Equation (3), a new set of weights are obtained, in the form of weightvec_2.

Care should be exerted in applying equation 3. It can be seen that in the minimum and maximum operations shown, a subscript (C) exists is associated with the borehole-corrected values (RaBC). This subscript is to signify that when borehole-corrected resistivity values are further corrected using this process, the corrected versions of the borehole-corrected values should be used in subsequent modes, instead of the original (uncorrected) borehole-corrected values. Thus, correction should start from mode K, the deepest mode that is deemed susceptible to caving effects, which is Mode 2 in this example. If the borehole-corrected apparent resistivity of Mode 2 is further corrected, then the next deepest mode (Mode 1 in this example) should be tested using the corrected version of the borehole-corrected resistivity associated with the deepest mode (i.e., Mode 2), and so on.

Figure 6:
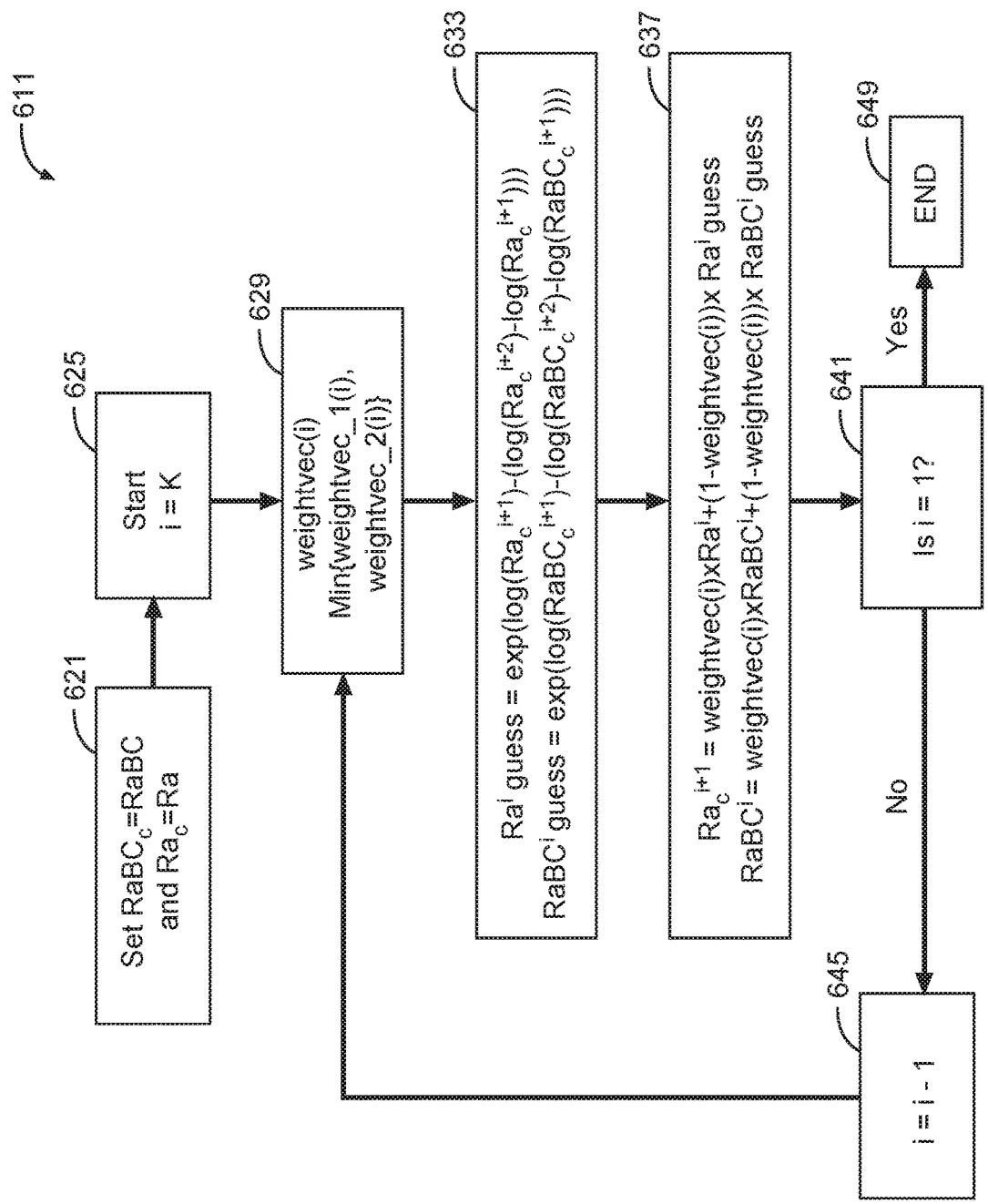
FIG. 6 is a flow diagram illustrating various correction methods, according to various embodiments.

FIG. 6 is a flow diagram illustrating various correction methods 611, according to various embodiments. Once the two sets of weight vectors (weightvec_1 and weightvec_2, provided by Equations (2) and (3), respectively) are determined, borehole-corrected resistivities and raw apparent resistivities are corrected. Assuming K is less than N−1, this occurs according to the process outlined in FIG. 6.

Thus, at block 621, the corrected versions of apparent resistivity and borehole-corrected resistivity (Ra$_c$ and RaBC$_C$, respectively) are initialized to be equal to the raw and borehole-corrected apparent resistivities (Ra and RaBC, respectively). The value of i is set=K at block 625. The weighting value of weightvec(i) is set to the minimum of weightvec_1 (i) and weightvec_1 (i) at block 629.

Guess values Ra$^i$guess and RaBC$^i$guess are determined at block 633. Then the next replacement values RaBC$_C^i$ and Ra$_c^i$ are determined at block 637.

If the last mode is encountered at block 64:1, then the method 611 ends at block 649. Otherwise, the next mode is set at block 645, and calculations for replacement values are made for this mode at block 629, 633, and 637.

The process flow illustrated in FIG. 6 is one example of the process that may be used, and other implementations are possible. For example, if i>N−2, instead of using modes i+2 and i+1 to calculate Ra$^i$guess and RaBC$^i$guess, these values may simply be set to be equal to Ra$^{i+1}$ and RaBC$^{i+1}$, respectively. Alternatively, in some embodiments, a linear approximation may be used to calculate these guesses. These and other possibilities will become apparent to those of ordinary skill in the art, after reading this document.

Figure 7:
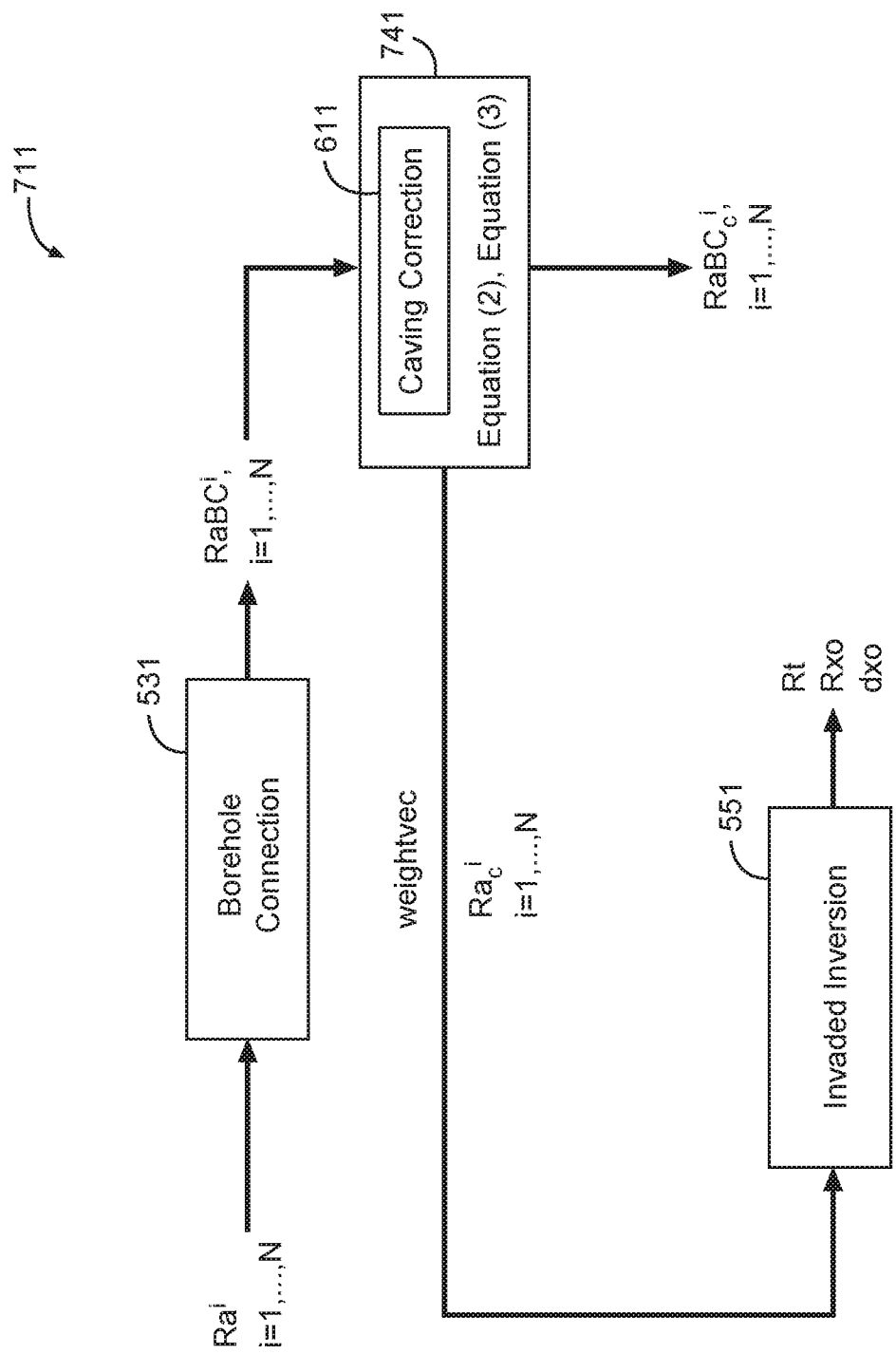
FIG. 7 is a flow diagram illustrating methods of correction as part of inversion, according to various embodiments.

FIG. 7 is a flow diagram illustrating methods 711 of correction as part of inversion, according to various embodiments. After correction, corrected raw apparent resistivity values, and corrected versions of the borehole-corrected apparent resistivity values may be provided to an inversion process.

For example, the process of inversion shown in FIG. 5 may be enhanced by using the process flow shown in FIG. 7. In this case, it is assumed that those of ordinary skill in the art are familiar with the processes of blocks 531, 551, first shown in FIG. 5. Block 741 includes the operations shown in Equations (2) and (3), as well as the methods 611 shown in FIG. 6.

It is noted that weights calculated during processing at block 741 are also provided as input to the inversion at block 551. These weights may be used to decrease the sensitivity of the inversion to apparent resistivities that are deemed more susceptible to the caving effect (e.g., those in Mode 1 in the example) by modifying the cost function of the inversion at block 551.

Comparison of Enhanced Inversion Results

To demonstrate the effectiveness of the enhanced inversion methods 711, inversion of a noninvaded chip formation without any caving effect will first be considered. It will be demonstrated that correction does not significantly affect measurement results where caving effects are absent.

Figure 8:
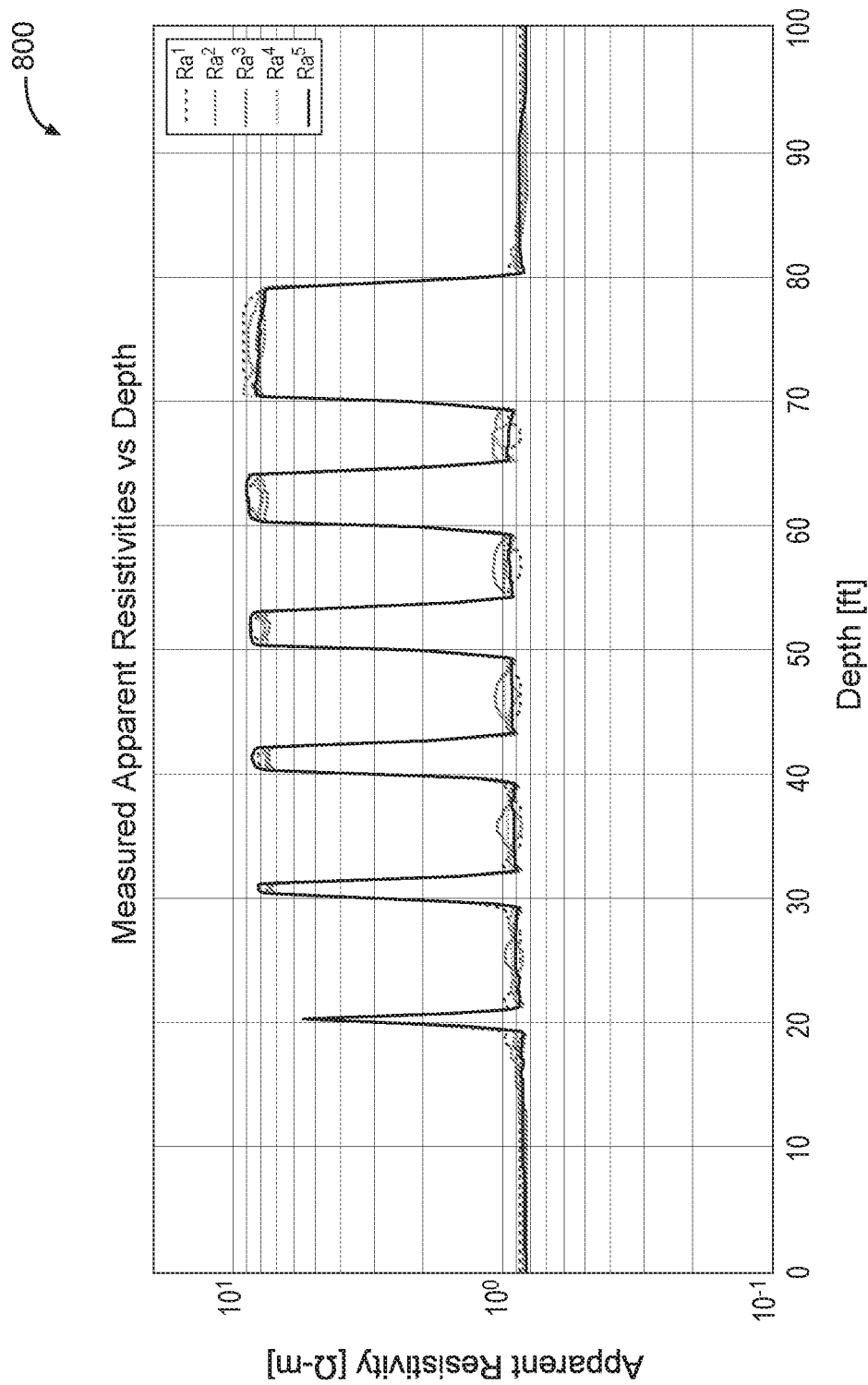
FIG. 8 is a graph of simulated tool measurement results Ra for a non-invaded formation, according to various embodiments.

FIG. 8 is a graph 800 of simulated tool measurement results Ra for a non-invaded formation, according to various embodiments, In the chirp formation, Rm is 0.1 Ω-m and Rt ranges between 1 and 10 Ω-m. Simulated results for what the laterolog tool should measure as apparent resistivities are plotted. Here it can be seen that apparent resistivity measurements for all modes (Ra1-Ra5) follow each closely across each of the measurement zones.

Figure 9:
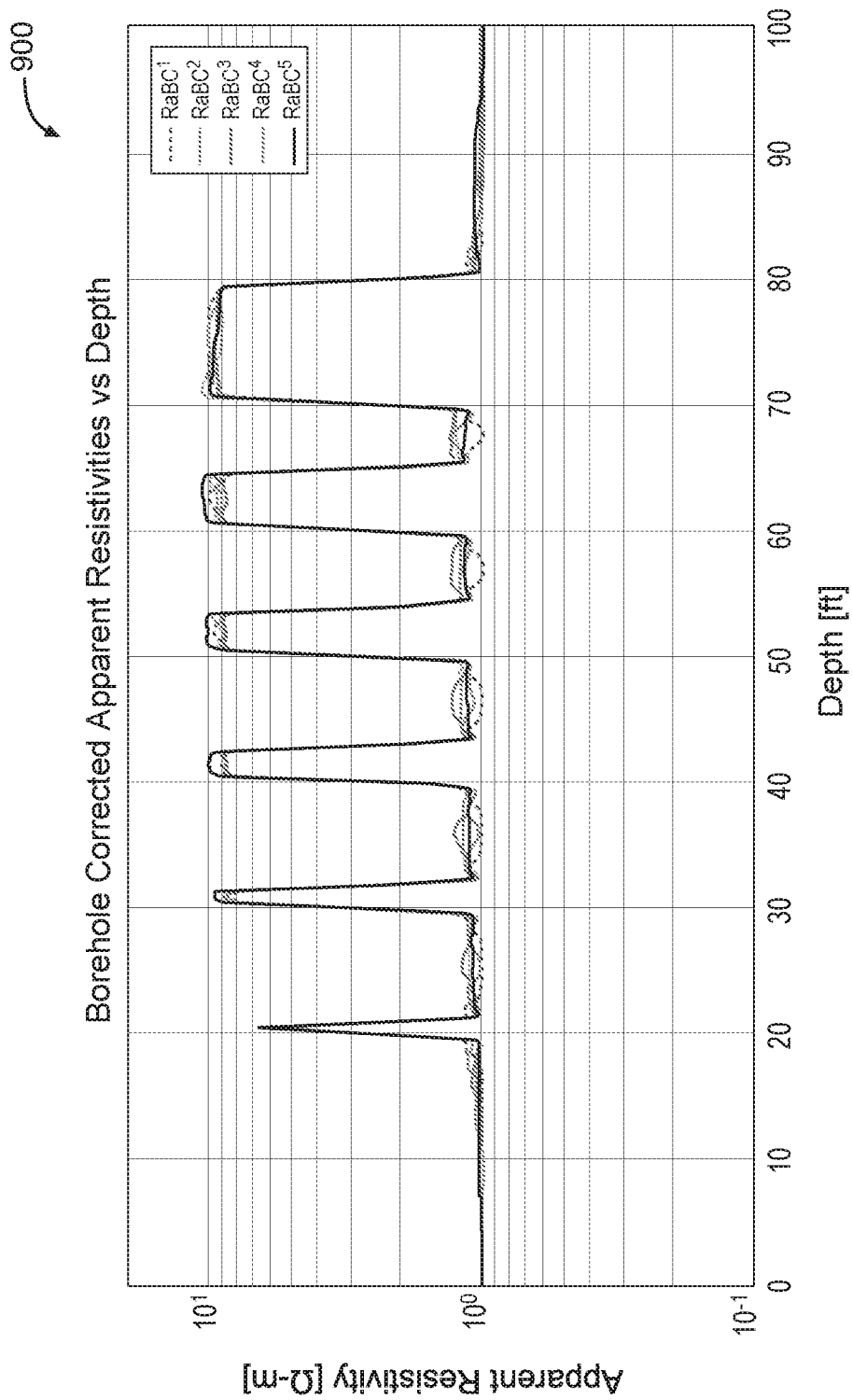
FIG. 9 is a graph of borehole-corrected apparent resistivity RaBC values for the formation of FIG. 8, obtained from the inversion of FIG. 5, according to various embodiments.

FIG. 9 is a graph 900 of borehole-corrected apparent resistivity values Ra BC for the formation of FIG. 8, obtained from the inversion of FIG. 5, according to various embodiments. Here the correction results for the chirp formation using inversion without the benefit of the activities shown in block 741 of FIG. 7. Here, it is seen that the borehole-corrected apparent resistivity for all modes is also very close to the true resistivity in thick zones, as expected.

Figure 10:
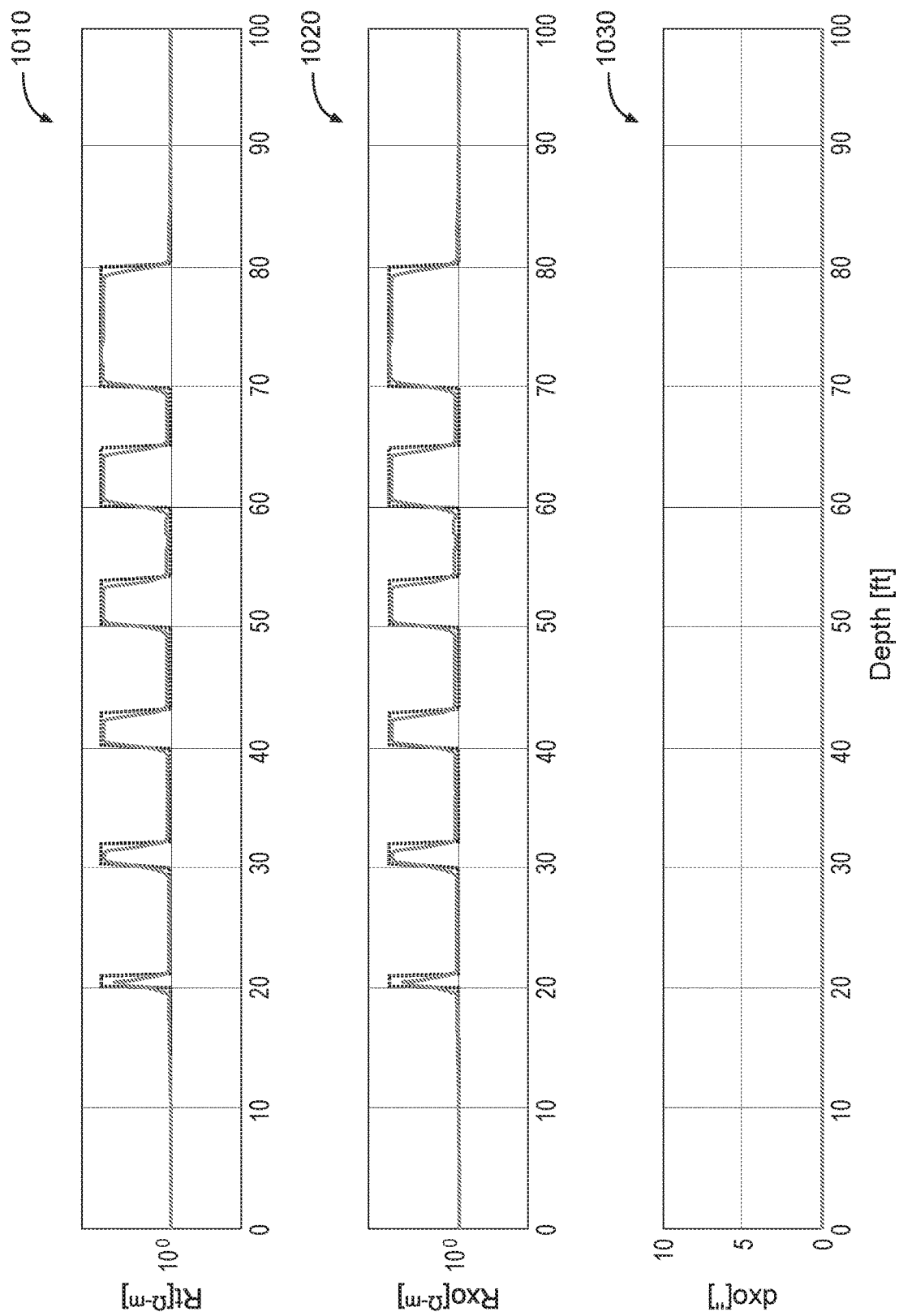
FIG. 10 is a graph of inverted Rt, Rxo, and dxo values for the formation of FIG. 8, obtained from the inversion of FIG. 5, according to various embodiments.

FIG. 10 provides graphs 1010, 1020, 1030 of inverted Rt, Rxo, and dxo values for the formation of FIG. 8, obtained from the inversion of FIG. 5, according to various embodiments. Graph 1010 shows the inverted values of Rt (solid line), graph 1020 shows the inverted values of Rxo (solid line), and graph 1030 shows the inverted values of dxo (solid line). Real values for Rt, Rxo and dxo are shown as dotted lines in graphs 1010, 1020, and 1030, respectively. A high level of conformance after inversion can be observed.

Figure 11:
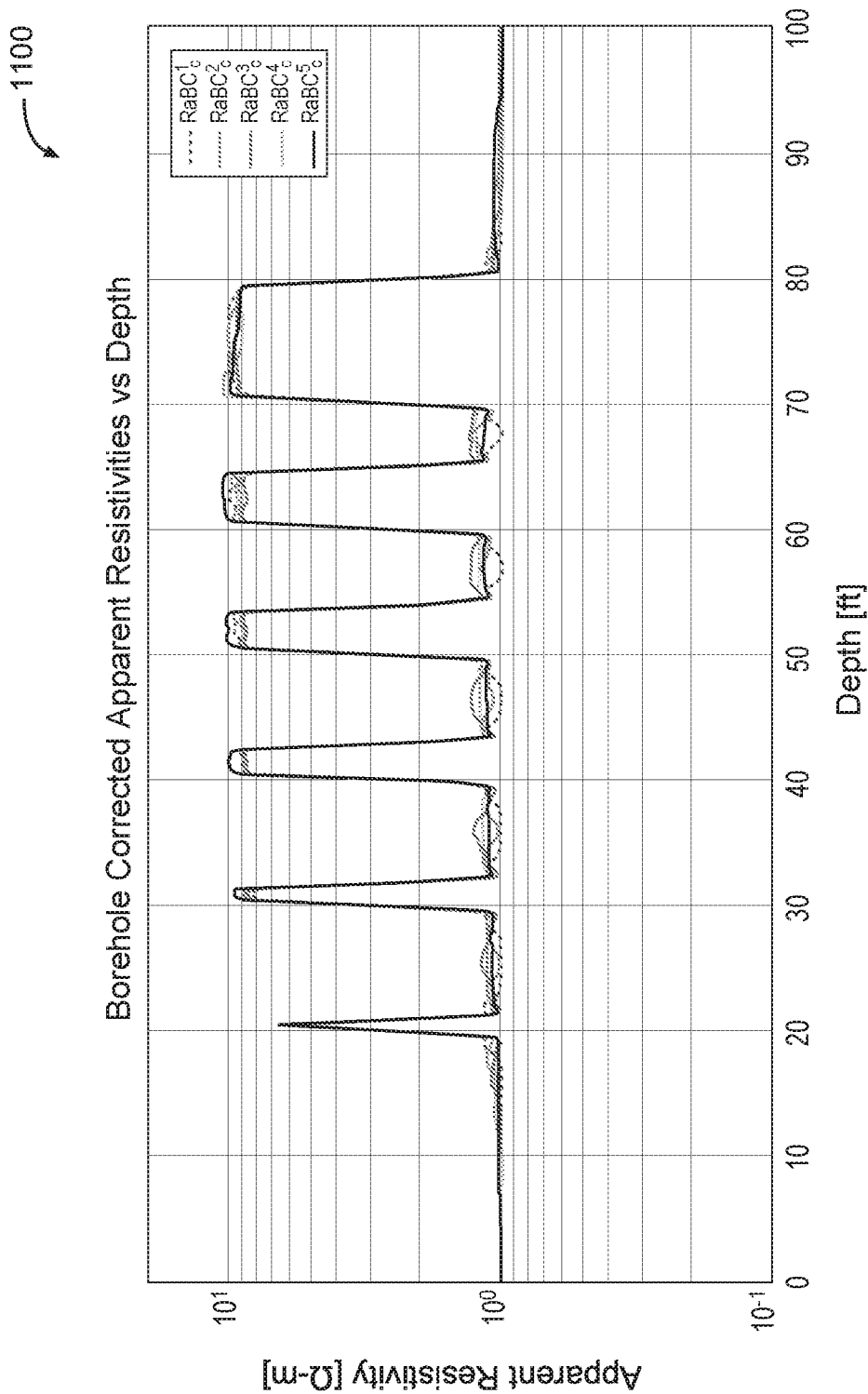
FIG. 11 is a graph of borehole-corrected apparent resistivity RaBC values for the formation of FIG. 8, obtained from the inversion of FIG. 7, according to various embodiments.

FIG. 11 is a graph 1100 of borehole-corrected apparent resistivity RaBC values for the formation of FIG. 8, obtained from the inversion of FIG. 7, according to various embodiments. The RaBC values are shown for each of the Modes 1-5.

Figure 12:
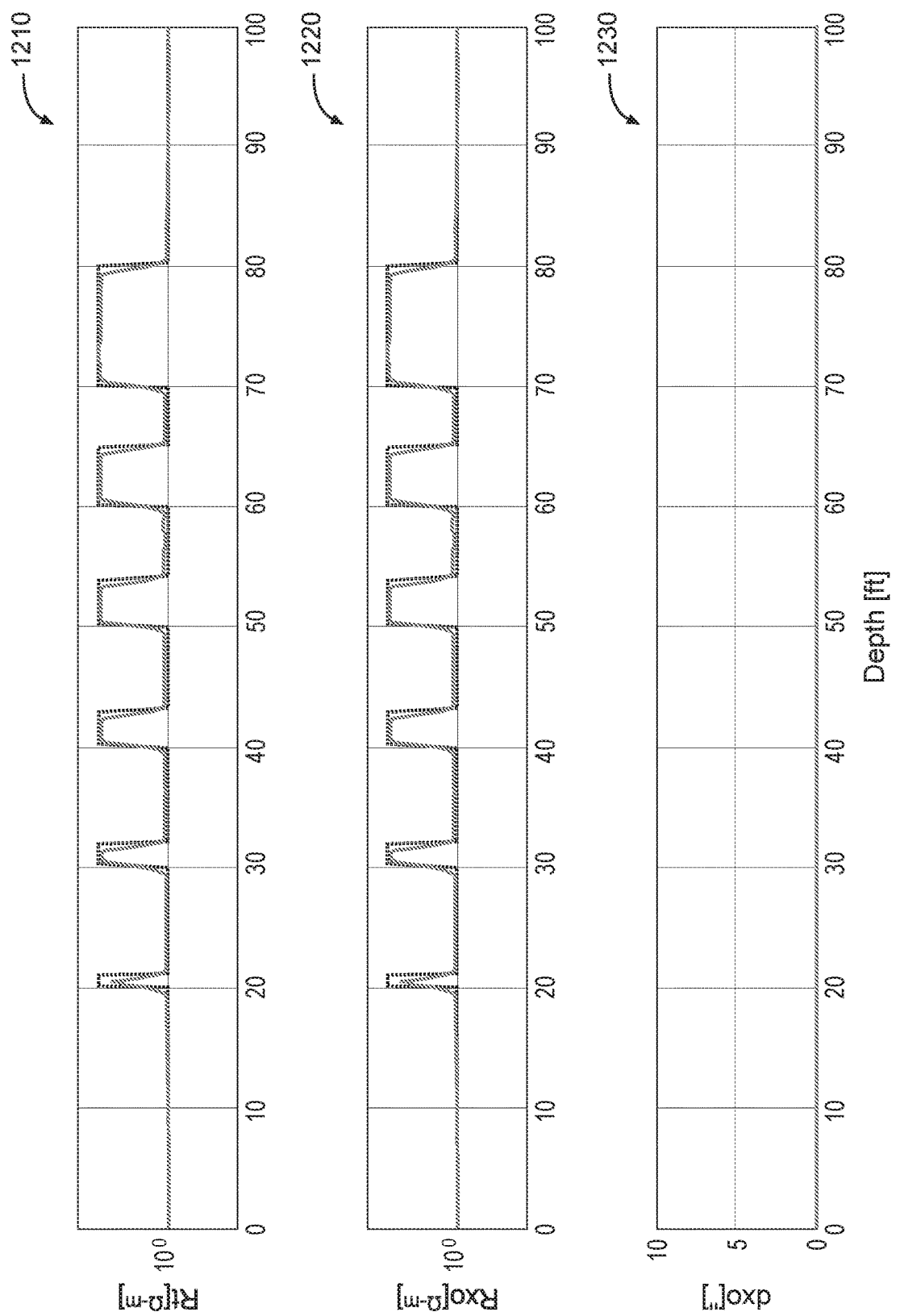
FIG. 12 provides graphs of inverted Rt, Rxo, and dxo values for the formation of FIG. 8, obtained from the inversion of FIG. 7, according to various embodiments.

FIG. 12 provides graphs 1210, 1220, 1230 of inverted Rt, Rxo, and dxo values for the formation of FIG. 8, obtained from the inversion of FIG. 7, according to various embodiments. Graph 1210 shows the inverted values of Rt (solid line), graph 1220 shows the inverted values of Rxo (solid line), and graph 1230 shows the inverted values of dxo (solid line). Real values for Rt, Rxo and dxo are shown as dotted lines in graphs 1210, 1220, and 1230, respectively.

In FIGS. 11 and 12, borehole correction and inversion results are plotted again for the same formation, but in this case, the activities shown in block 741 of FIG. 7 are used to implement correction for caving effects. As intended, the results in the figures are substantially the same as when only the inversion of FIG. 5 is used, when no caving effect is present. Thus, as desired, it can be seen that correction does not significantly affect measurement results where caving effects are absent.

Figure 13:
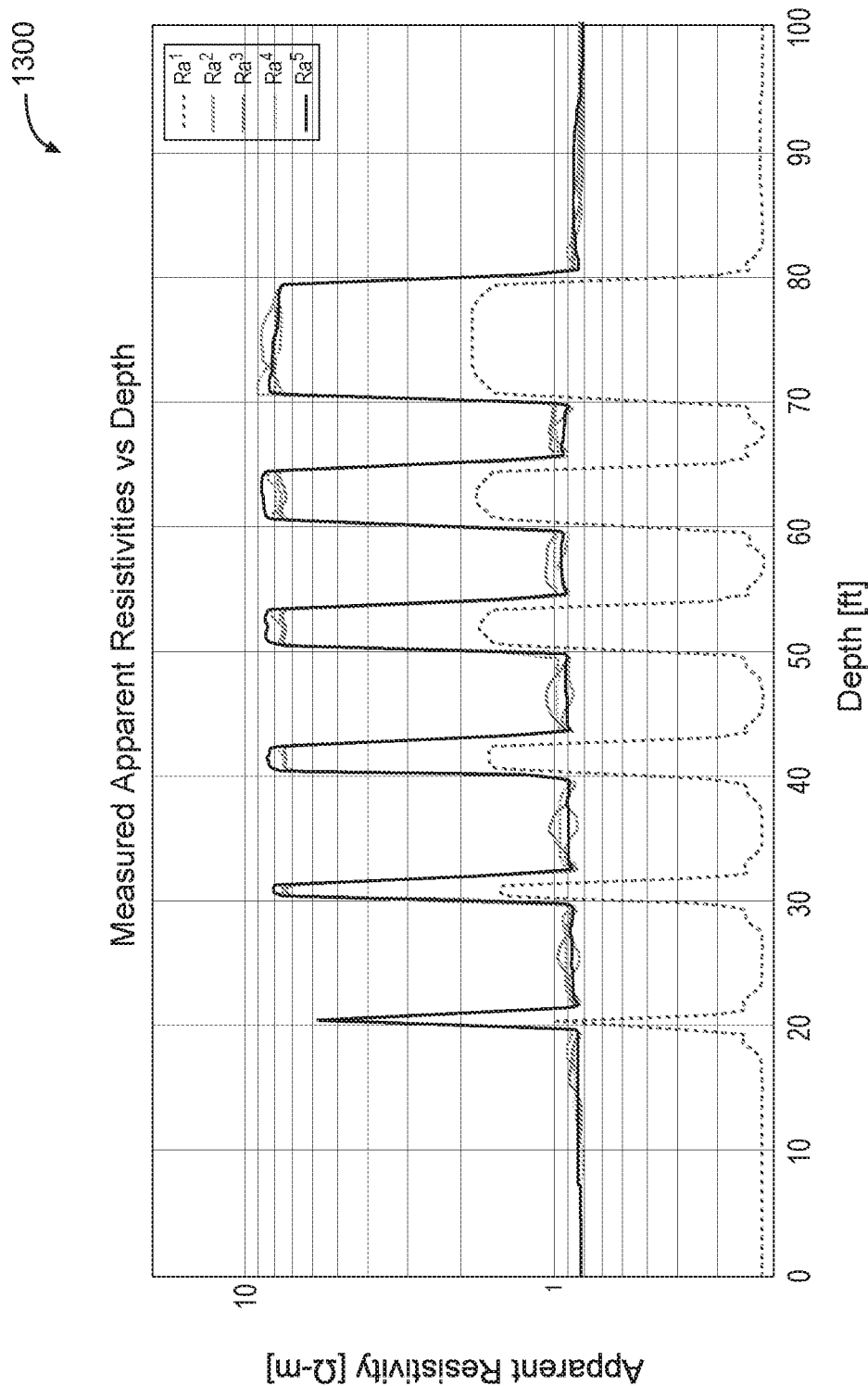
FIG. 13 is a graph of simulated tool measurement results Ra for a non-invaded formation, with caving effects present, according to various embodiments.

FIG. 13 is a graph 1300 of simulated tool measurement results Ra for a non-invaded formation, with caving effects present, according to various embodiments. To simulate caving effects, the apparent resistivity of Mode 1 (Ra1)

shown in FIG. 8 is artificially lowered, The resulting apparent resistivities (that are used as input to inversion) are shown in FIG. 13. Thus, although other, deeper, resistivity readings in this case are normal, the resistivity reading for Mode 1 is problematic since it is significantly lower than the other modes.

Figure 14:
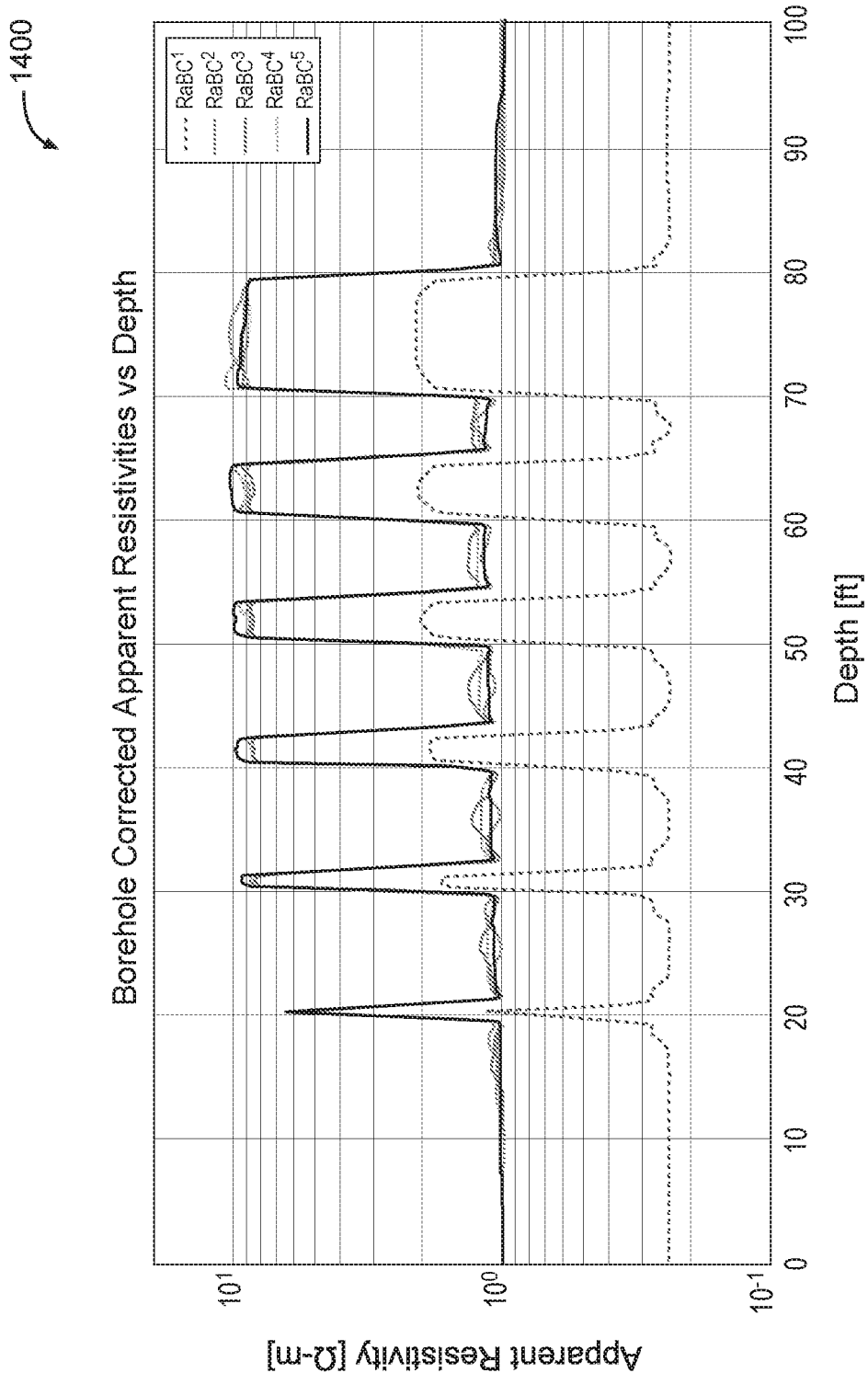
FIG. 14 is a graph of borehole-corrected apparent resistivity RaBC values for the formation of FIG. 13, obtained from the inversion of FIG. 5, according to various embodiments.

FIG. 14 is a graph 1400 of borehole-corrected apparent resistivity RaBC values for the formation of FIG. 13, obtained from the inversion of FIG. 5, according to various embodiments. Here the results of borehole correction using the inversion of FIG. 5 is used to obtain values of apparent resistivity. It is apparent that borehole correction did not correct the problem shown for Mode 1. As a result, the log in this case appears erroneous, and the end user would be unsure of the accuracy of the measurements.

Figure 15:
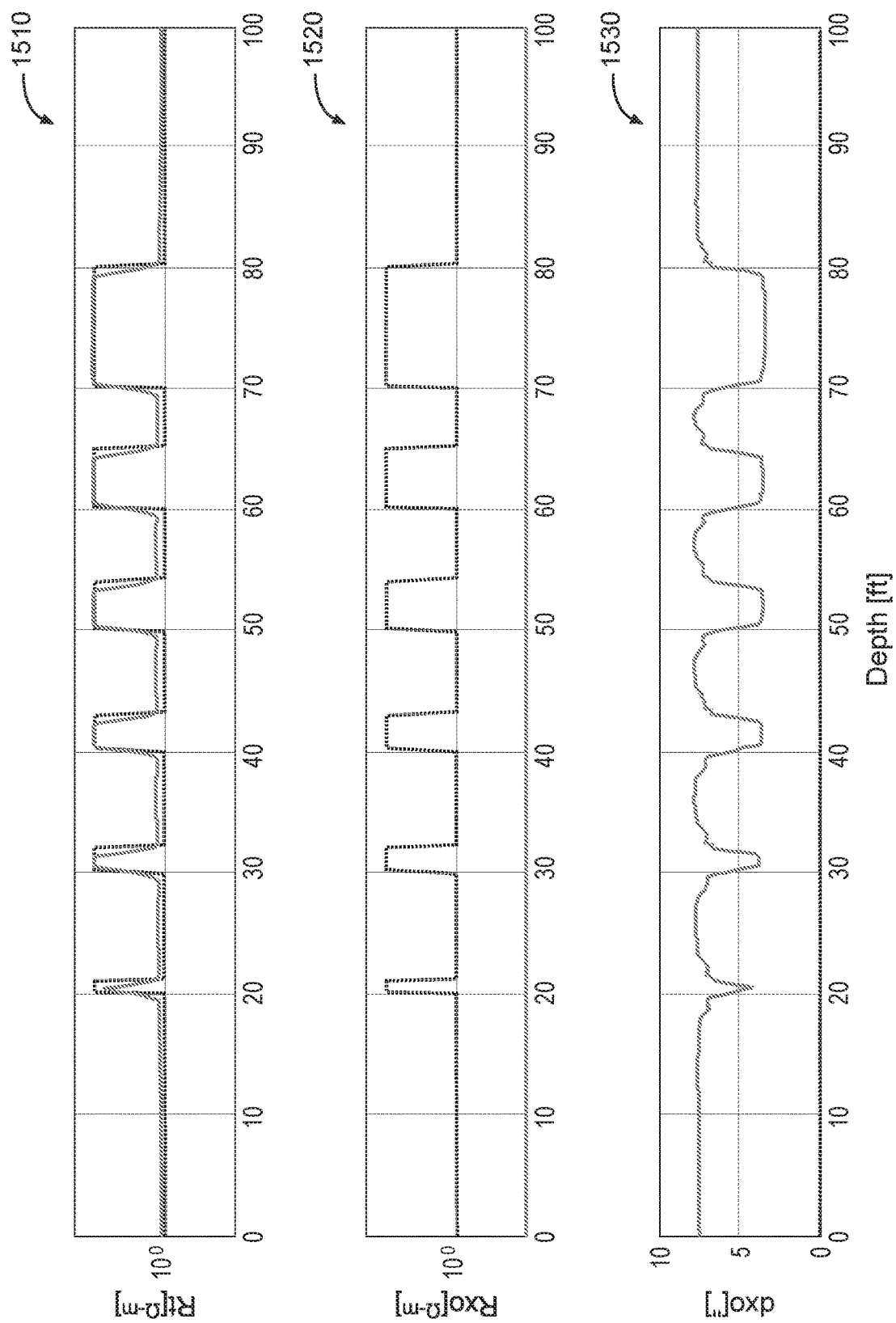
FIG. 15 provides graphs of inverted Rt, Rxo, and dxo values for the formation of FIG. 13, obtained from the inversion of FIG. 5, according to various embodiments.

FIG. 15 provides graphs 1510, 1520, 1530 of inverted Rt, Rxo, and dxo values for the formation of FIG. 13, obtained from the inversion of FIG. 5, according to various embodiments. Graph 1510 shows the inverted values of Rt (solid line), graph 1520 shows the inverted values of Rxo (solid line), and graph 1530 shows the inverted values of dxo (solid line), Real values for Rt, Rxo and dxo are shown as dotted lines in graphs 1510, 1520, and 1530, respectively. Although the inverted values of Rt are not affected, inversion predicts a very conductive invasion as a result of the inaccuracy in Mode 1 measurements.

Figure 16:
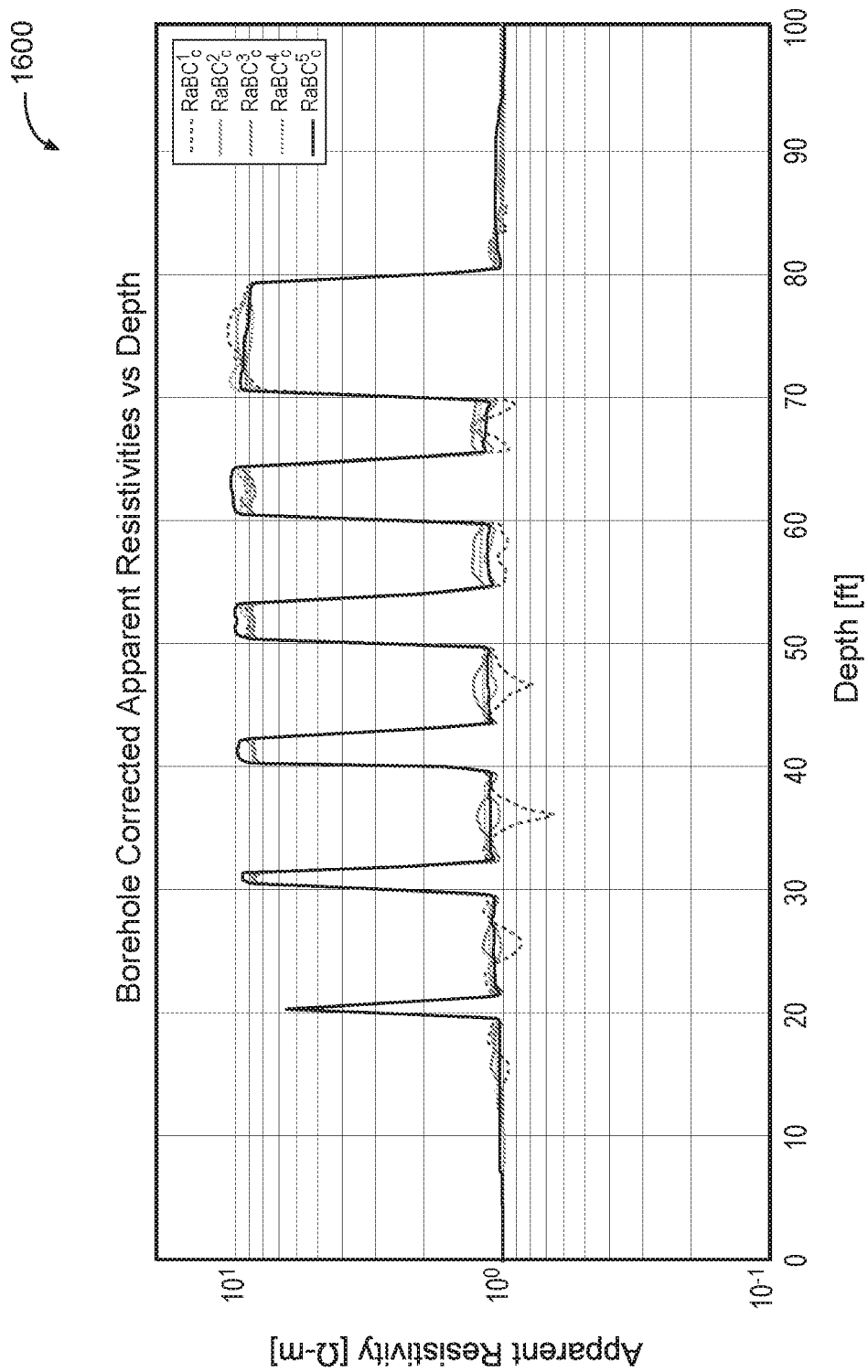
FIG. 16 is a graph of borehole-corrected apparent resistivity RaBC values for the formation of FIG. 13, obtained from the inversion of FIG. 7, according to various embodiments.

FIG. 16 is a graph 1600 of borehole-corrected apparent resistivity RaBC values for the formation of FIG. 13, obtained from the inversion of FIG. 7, according to various embodiments. Here the borehole-corrected apparent resistivities are processed using an inversion with caving effect correction as described in various embodiments (e.g,, the activities shown in block 741 of FIG. 7). Here it can be seen that correct readings for Mode 1 are recovered almost perfectly. The result is a log that is easy to interpret; one that confirms the accuracy of the measurement, instead of creating doubt.

Figure 17:
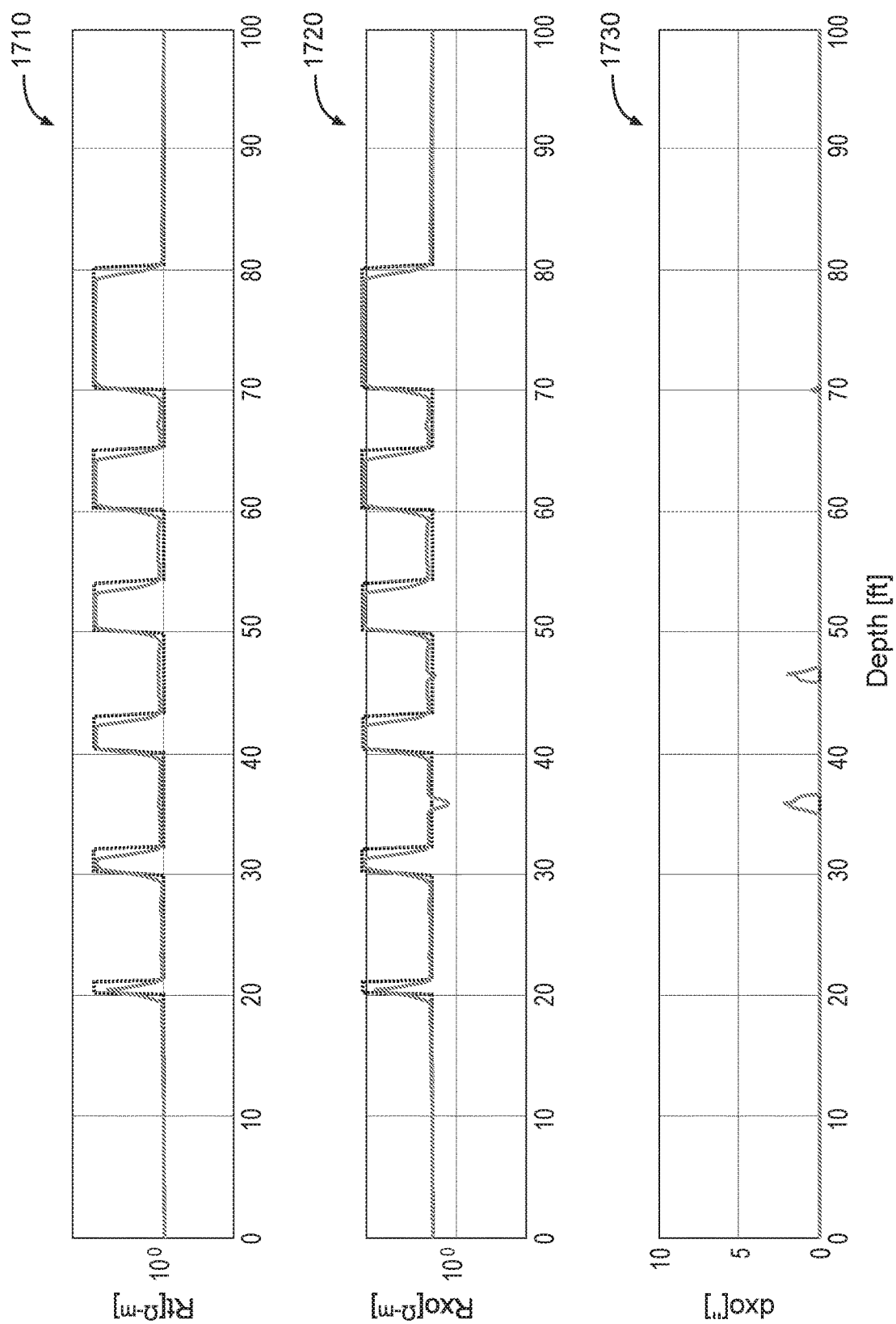
FIG. 17 provides graphs of inverted Rt, Rxo, and dxo values for the formation of FIG. 13, obtained from the inversion of FIG. 7, according to various embodiments.
Figure 18:
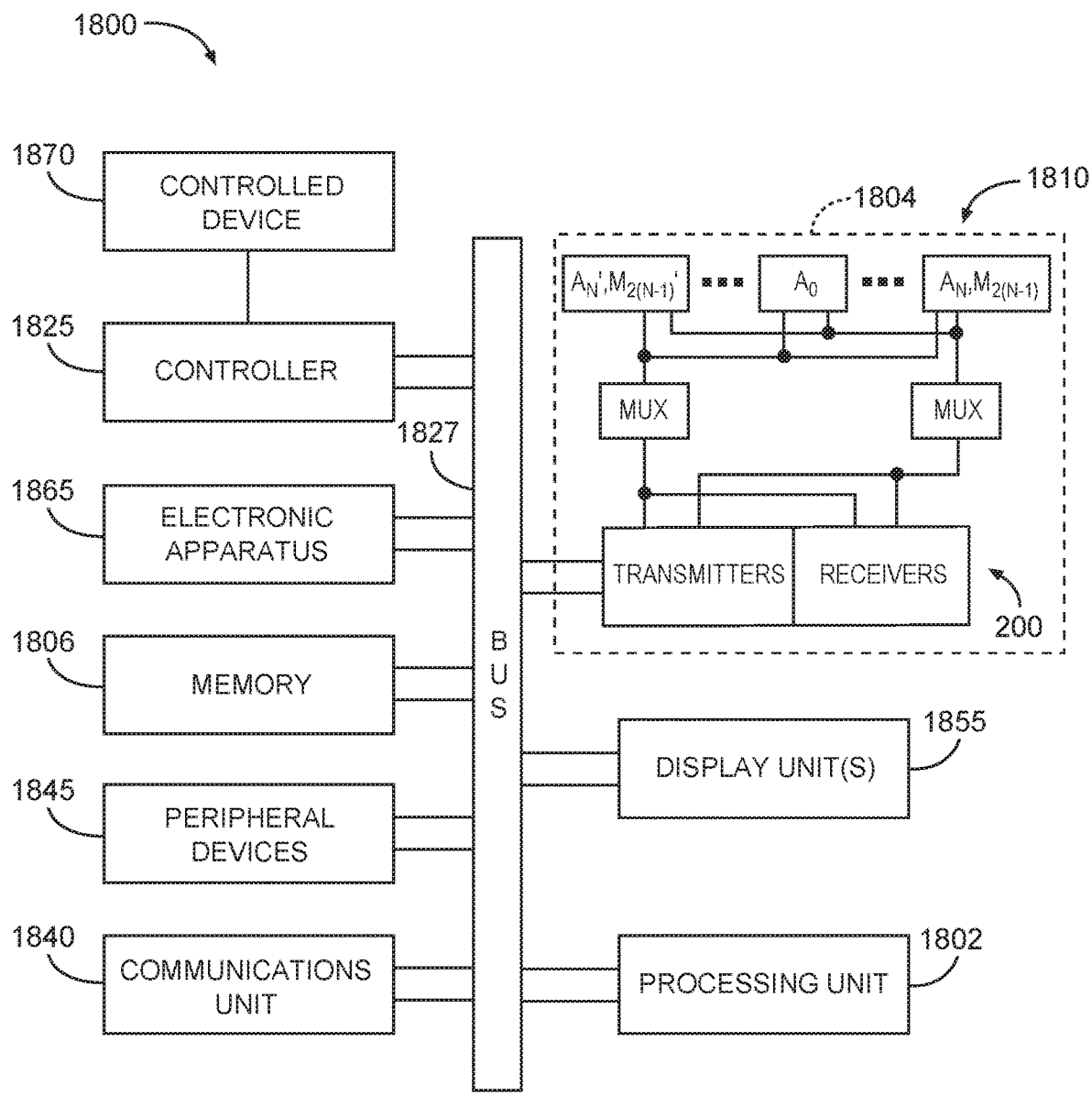
FIG. 18 is a block diagram of systems and apparatus according to various embodiments.

FIG. 17 provides graphs 1710, 1720, 1730 of inverted Rt, Rxo, and dxo values for the formation of FIG. 13, obtained from the inversion of FIG. 7, according to various embodiments. Here the results of inversion, with the benefit of correction for caving effects as described herein (e.g., the activities shown in block 741 of FIG. 7), are almost same as the results obtained in the case where no caving effects were present (see FIG. 10). In this case, the use of correction for caving effects predicts a formation with almost no invasion, and correct values of Rt, Rxo and dxo.

Even though this case, illustrated by FIG. 13, represents a difficult problem, and the outcome shown in FIGS. 16-17 is not perfect, the inverted values are much closer to the real values than what is obtained using inversion methods that do not use correction for caving effects. Large variations in the values are not present, and the end result is much easier to interpret. In short, the process is improved to a noticeable degree. Still further embodiments may be realized, Apparatus and Systems For example, FIG, 18 is a block diagram of systems 1800 and apparatus 1810 according to various embodiments. Here the 2N guard electrodes ($A_1$, $A_1'$, ..., $A_N$, $A_N'$) and 4N-4 monitor electrodes ($M_1$, $M_1'$, $M_2$, $M_2'$, ..., $M_{2(N-1)}$, $M_{2(N-1)}'$) correspond to the same or similar elements shown in the array of FIG. 2, forming part of a laterolog array tool 200. One or more multiplexer units MUX may be included in the tool 200, as well as one or more transmitter/receiver/transceiver units TRANSMITTERS and RECEIVERS, respectively comprising one or more transmitters and/or receivers, and combinations thereof, including transceivers. The processing unit 1802 may comprise a resistivity signal processor.

Here it can be seen that the processing unit 1802 can form part of the system 1800 to control the acquisition and processing of resistivity measurements within the system 1800, using apparatus 1810. In some embodiments, a logging system 1800 comprises one or more of the apparatus 1810 (e.g., a tool or sub), including a housing 1804. The housing 1804 might take the form of a wireline tool body, or a downhole tool as described in more detail below with reference to FIGS. 20 and 21. The processing unit 1802 may be part of a surface workstation or attached to the housing 1804.

The system 1800, which may comprise a logging system, can include a controller 1825, other electronic apparatus 1865, and a communications unit 1840. The controller 1825 and the processing unit 1802 can be fabricated to operate one or more components of the apparatus 1810 to acquire measurement data, such as resistivity measurements.

Electronic apparatus 1865 (e.g., electromagnetic sensors, etc.) can be used in conjunction with the controller 1825 to perform tasks associated with taking resistivity measurements downhole. The communications unit 1840 can include downhole communications in a drilling operation. Such downhole communications can include telemetry.

The system 1800 can also include a bus 1827 to provide common electrical signal paths between the components of the logging system 1800. The bus 1827 can include an address bus, a data bus, and a control bus, each independently configured. The bus 1827 can also use common conductive lines for providing one or more of address, data, or control, the use of which can be regulated by the controller 1825.

The bus 1827 can include instrumentality for a communication network. The bus 1827 can be configured such that the components of the logging system 1800 are distributed. Such distribution can be arranged between downhole components such as the apparatus 1810 and system 1800, and components that can be disposed on the surface of a well. Alternatively, several of these components can be co-located, such as on one or more collars of a drill string or on a wireline structure.

In various embodiments, the logging system 1800 includes peripheral devices that can include display units 1855, additional storage memory, or other control devices that may operate in conjunction with the controller 1825 or the processing unit 1802. The display units 1855 can display diagnostic information for the system 1800 based on the signals generated according to embodiments described above. The display units 1855 can also be used to display one or more graphs of various measured and determined parameters, similar to or identical to what is illustrated in FIGS. 8-17.

In an embodiment, the controller 1825 can be fabricated to include one or more processors. The display units 1855 can be fabricated or programmed to operate with instructions stored in the processing unit 1802 (for example in the memory 1806) to implement a user interface to manage the operation of the system 1800 or components distributed within the system 1800. This type of user interface can be operated in conjunction with the communications unit 1840 and the bus 1827. Various components of the system 1800 can be integrated with an associated housing such that processing identical to or similar to the methods discussed with respect to various embodiments herein can be performed downhole.

In various embodiments, a non-transitory machine-readable storage device can include instructions stored thereon, which, when performed by a machine, cause the machine to become a customized, particular machine that performs operations comprising one or more activities similar to or identical to those described with respect to the methods and techniques described herein. A machine-readable storage device, herein, is a physical device that stores information (e.g., instructions, data), which when stored, alters the physical structure of the device. Examples of machine-readable storage devices include, but are not limited to, memory 1806 in the form of read only memory (ROM), random access memory (RAM), a magnetic disk storage device, an optical storage device, a flash memory, and other electronic, magnetic, or optical memory devices, including combinations thereof.

The physical structure of stored instructions may thus be operated on by one or more processors such as, for example, the processing unit 1802. Operating on these physical structures can cause the machine to perform operations according to methods described herein. The instructions can include instructions to cause the processing unit 1802 to store associated data or other data in the memory 1806. The memory 1806 can store the results of measurements of formation parameters or parameters of the system 1800, to include gain parameters, calibration constants, identification data, etc. The memory 1806 can store a log of the resistivity measurements obtained by the system 1800. The memory 1806 therefore may include a database, for example a relational database.

Thus, referring to FIGS. 1-18, it can be seen that many embodiments may be realized. For example, a system 1800 may comprise a tool (e.g., apparatus 1810) to make resistivity measurements in a geological formation, and a processing unit 1802 to process the results according to Equations (2) and (3), to determine true resistivity values for the formation.

In some embodiments, a system 1800 comprises at least one tool (e.g., as a form of the apparatus 1810) to measure resistivity in a borehole associated with a geological formation as measured formation resistivity data. The system 1800 may further comprise a processing unit 1802 coupled to the at least one tool to receive the measured formation resistivity data. The processing unit 1802 can operate to transform anomalous formation resistivity values within the measured formation resistivity data into corrected formation resistivity values based on mud resistivity in the borehole, and to transform anomalous borehole-corrected apparent resistivity values derived from the measured formation resistivity data to provide corrected versions of the borehole-corrected apparent resistivity data based on apparent resistivity separation. The processing unit 1802 can further operate to invert the corrected formation resistivity values and the corrected versions of the borehole-corrected apparent resistivity data to determine true resistivity values for the geological formation.

The system 1800 may include a bit steering mechanism. Thus, in some embodiments, the system 1800 comprises a bit steering device (as one form of a controlled device 1870) to operate in response to the true resistivity values determined by the processing unit 1802, to control drilling operations in the geological formation.

The tool may comprise a laterolog tool. Thus, in some embodiments of the system 1800, the at least one tool comprises an array laterolog tool.

A monitor, such as an audible alarm or display, may be used to determine transitions from invaded to non-invaded regions. The monitor may take the form of one of the peripheral devices 1845. Thus, in some embodiments, the system 1800 comprises a monitor to indicate transitions from invaded to non-invaded regions of the geological formation, based on the true resistivity values determined by the processing unit. These transitions can be detected by determining abrupt changes in the formation resistivity Rt, as determined according to various methods outlined herein.

The apparatus 1810, system 1800, and each of their elements may all be characterized as "modules" herein. Such modules may include hardware circuitry, and/or a processor and/or memory circuits, software program modules and objects, and/or firmware, and combinations thereof, as desired by the architect of the apparatus 1810 and systems 1800, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a formation imaging package, an energy detection and measurement package, a resistivity measurement package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 1810 and systems 1800 are intended to provide a general understanding of the structure of various embodiments, and they are not intended to serve as a complete description of all the elements and features of apparatus and systems that might make use of the structures described herein. For example, some embodiments include a number of methods, which will now be described.

Additional Methods

Figure 19:
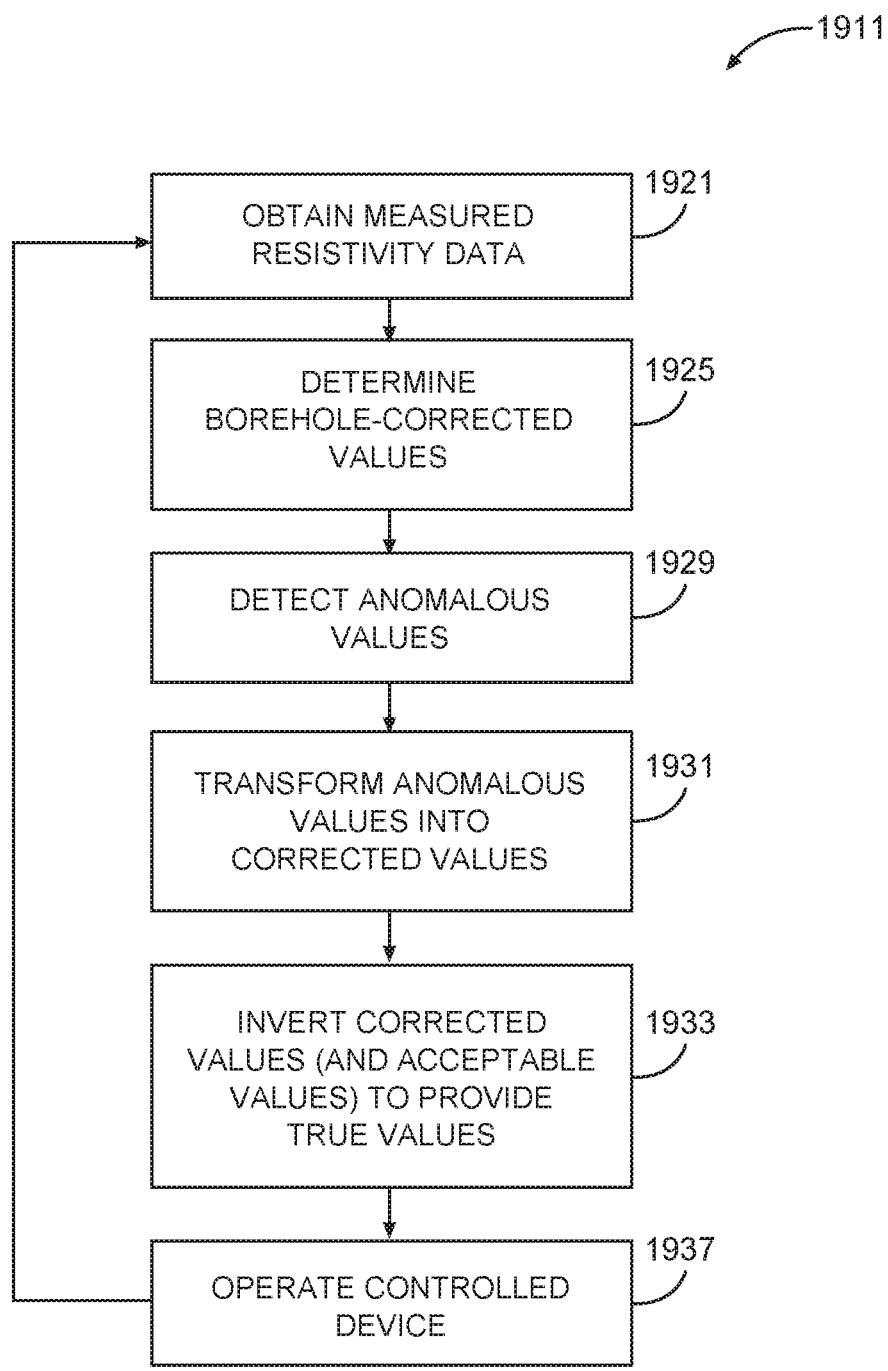
FIG. 19 is a flow chart illustrating additional methods according to various embodiments.

FIG. 19 is a flow chart illustrating additional methods 1911 according to various embodiments. The methods 1911 may comprise processor-implemented methods, to execute on one or more processors that perform the methods, For example, one embodiment of the methods 1911 (e.g., that makes use of Equation (2)) may begin at block 1929 with detecting measurement anomalies based on mud resistivity, and then go on to correcting the data by transforming the anomalous measurement data at block 1931, inverting the corrected result to determine formation characteristics at block 1933, and controlling a device at block 1937, based on the determined formation characteristics.

In some embodiments (e.g., that make use of Equation (3)), the method 1911 begins at block 1929 with detecting measurement anomalies based on resistivity separation, and then go on to correcting the affected data by transforming the anomalous measurement data at block 1931, and inverting the corrected result to determine formation characteristics at block 1933. Other embodiments may be realized.

For example, it is noted that initial values of measured formation resistivity data can be obtained in a variety of ways, such as during wireline or drilling operations, perhaps using a laterolog or induction tool. Thus, some embodiments of the method 1311 begins at block 1921 with obtaining measured resistivity data from the geological formation during drilling operations, wherein the borehole-corrected apparent resistivity data is to be derived from the measured resistivity data.

Borehole-corrected formation resistivity data can be derived from the measured resistivity data using inversion.

Those of ordinary skill in the art are familiar with how to accomplish this activity, as noted previously. Others that desire further information can refer to the literature, including U.S. Pat. No. 8,775,084. Thus, some embodiments of the method 1911 comprise inverting the measured formation resistivity data to correct for borehole effects, to obtain the borehole-corrected apparent resistivity data at block 1925.

In some embodiments, the method 1911 may continue on to block 1929 to comprise detecting anomalous formation resistivity values within the measured formation resistivity data, based on mud resistivity associated with a borehole in a geological formation, the measured formation resistivity data comprising the anomalous formation resistivity values and acceptable formation resistivity values.

Upper and lower threshold values can be used to identify and bound the anomalous formation resistivity values in the raw measurement data. These upper and lower threshold values may be identified as an "upper caving threshold" and "lower caving threshold" herein, being similar to or identical to the values $Threshhigh^i$ and $Threshlow^i$ of Equation (2). Thus, in some embodiments, the activity of detecting the anomalous formation resistivity values at block 1929 comprises identifying the anomalous formation resistivity values as values in the measured formation resistivity data that are bounded by an upper caving threshold and a lower caving threshold.

In some embodiments, borehole-corrected data can be adjusted according to the mode, or depth of measurement. Anomalous values therein are identified using separation thresholds. Thus, in some embodiments, the activity at block 1929 comprises detecting anomalous borehole-corrected apparent resistivity values within borehole-corrected apparent resistivity data derived from the measured formation resistivity data. This may be accomplished, for example, by detecting anomalous borehole-corrected apparent resistivity values within borehole-corrected apparent resistivity data, based on apparent resistivity separation associated with a borehole in a geological formation, the borehole-corrected apparent resistivity data comprising the anomalous borehole-corrected apparent resistivity values and acceptable borehole-corrected apparent resistivity values.

Thus, threshold values can be used to identify and bound the anomalous values in the borehole-corrected apparent resistivity data. The terms "upper separation threshold" and a "lower separation threshold" may be identified herein, being similar to or identical to the values $Septhreshhigh^i$ and $Septhreshlow^i$ of Equation (3). Thus, in some embodiments detecting the anomalous borehole-corrected apparent resistivity values comprises identifying the anomalous borehole-corrected apparent resistivity values as values in the borehole-corrected apparent resistivity data that are bounded by an upper separation threshold and a lower separation threshold.

In some embodiments, the method 1911 may continue on to block 1931 to comprise transforming the anomalous formation resistivity values into corrected formation resistivity values. In some embodiments, transforming the anomalous formation resistivity values at block 1931 comprises calculating weighting vectors to be applied to the anomalous formation resistivity values to provide the corrected formation resistivity values, the weighting vectors to be determined according to a transition function. The transition function may be one of a linear transition function or a logarithmic transition function.

A range of modes can be designated for correction—so that only the deepest mode deemed to be affected by caving, and shallower modes, can be selected. Thus, in some embodiments, the activity at block 1931 comprises designating one of a plurality of measurement modes associated with a laterolog tool as a deepest mode to be associated with the transforming; and refraining from the activity of transforming for values of the measured resistivity data associated with the plurality of measurement modes that are deeper than the deepest mode.

In some embodiments, the method 1911 comprises, at block 1931, transforming the anomalous borehole-corrected apparent resistivity values into corrected versions of the borehole-corrected apparent resistivity values, based on resistivity separation thresholds and a weighted transition function. In some embodiments, transforming the anomalous borehole-corrected apparent resistivity values into corrected versions of the borehole-corrected apparent resistivity values is accomplished in an order determined by depth of the measured formation resistivity data.

In some embodiments, the activity of transforming the anomalous formation resistivity values at block 1931 comprises calculating weighting vectors to be applied to the anomalous borehole-corrected apparent resistivity values to provide the corrected versions of the borehole-corrected apparent resistivity values, the weighting vectors to be determined according to a logarithmic function of the upper and lower separation thresholds.

The initial results of transforming some of the anomalous values into corrected values can be used as a basis for subsequent transformation/correction. Thus, in some embodiments, the activity at block 1931 comprises calculating a first group of weighting vectors to be applied to some of the anomalous borehole-corrected apparent resistivity values to provide a first group of the corrected versions of the borehole-corrected apparent resistivity values; and calculating a second group of weighting vectors to be applied to a remaining number of the anomalous borehole-corrected apparent resistivity values, using the first group of the corrected versions of the borehole-corrected apparent resistivity values, to generate a second group of the corrected versions of the borehole-corrected apparent resistivity values.

In some embodiments, the method 1911 continues on to include, at block 1933, inverting the corrected formation resistivity values and the acceptable formation resistivity values to provide true resistivity values for a geological formation. In some embodiments, the activity at bock 1933 comprises inverting the corrected versions of the borehole-corrected apparent resistivity values and the acceptable borehole-corrected apparent resistivity values to provide true resistivity values for a geological formation.

In some embodiments, the method 1911 continues on to include, at block 1937, operating a controlled device according to the true resistivity values for the geological formation.

Drilling operations, such weight on bit or rotational rate of the bit, can be controlled based on the true resistivity values that have been determined. Thus, in some embodiments, operating the controlled device at block 1937 comprises controlling drilling operations in the geological formation based on the true resistivity values.

The controlled device may comprise a display, hardcopy printer, or storage device, among others. Thus, in some embodiments, operating the controlled device at block 1937 comprises publishing at least some of the true resistivity values for the geological formation in a human-readable form.

A variety of mechanisms can be operated as the controlled device. Thus, in some embodiments, operating the controlled device at block 1937 comprises controlling a bit steering device to select a drilling direction in the geological formation based on the true resistivity values for the geological formation.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIGS. 5-7 and 19) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein.

For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or inter-process communication techniques, including remote procedure calls. The teachings of various embodiments are not limited to any particular programming language or environment. Thus, other embodiments may be realized.

Additional Systems

Figure 20:
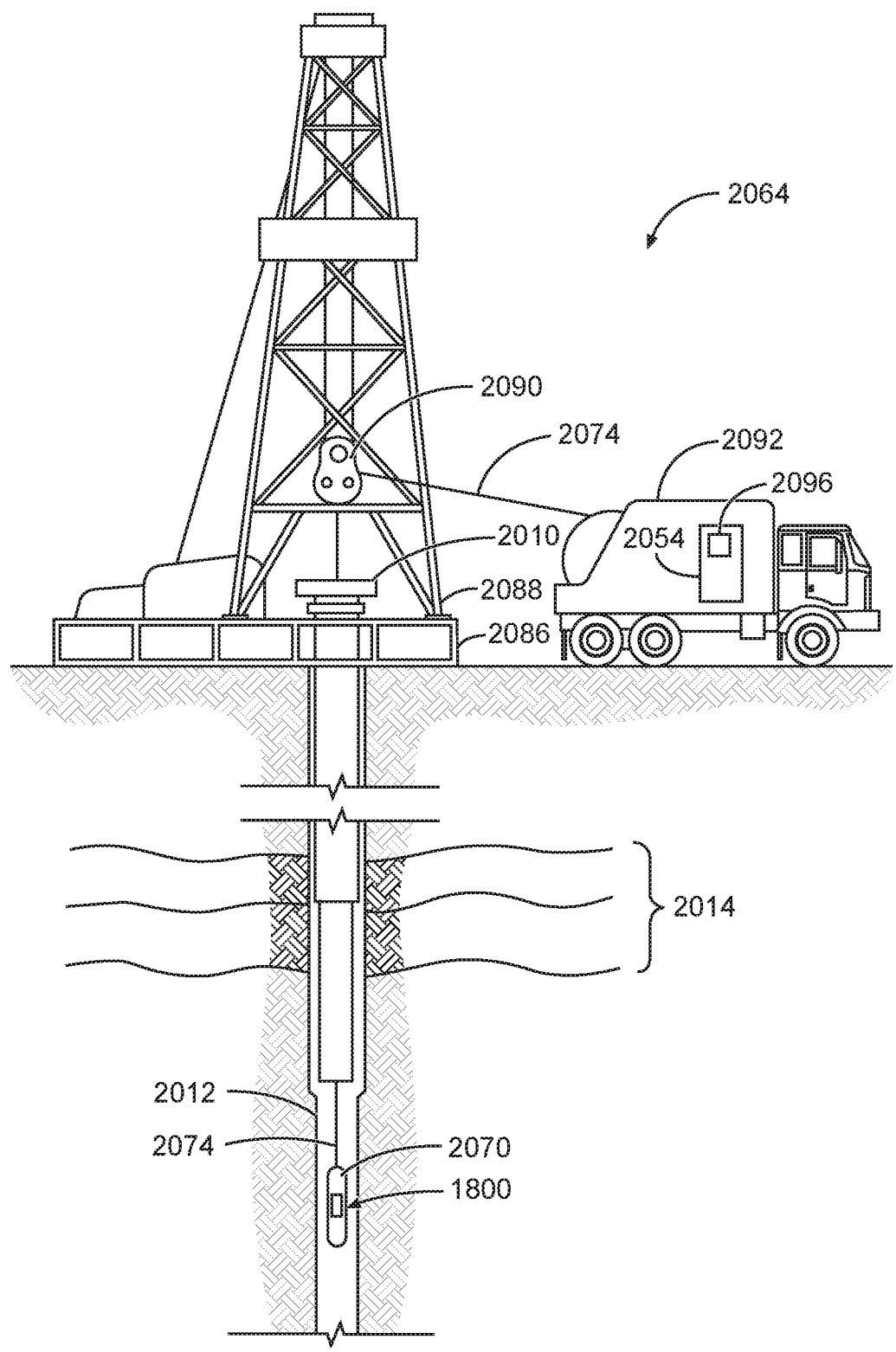
FIG. 20 illustrates a wireline system embodiment.
Figure 21:
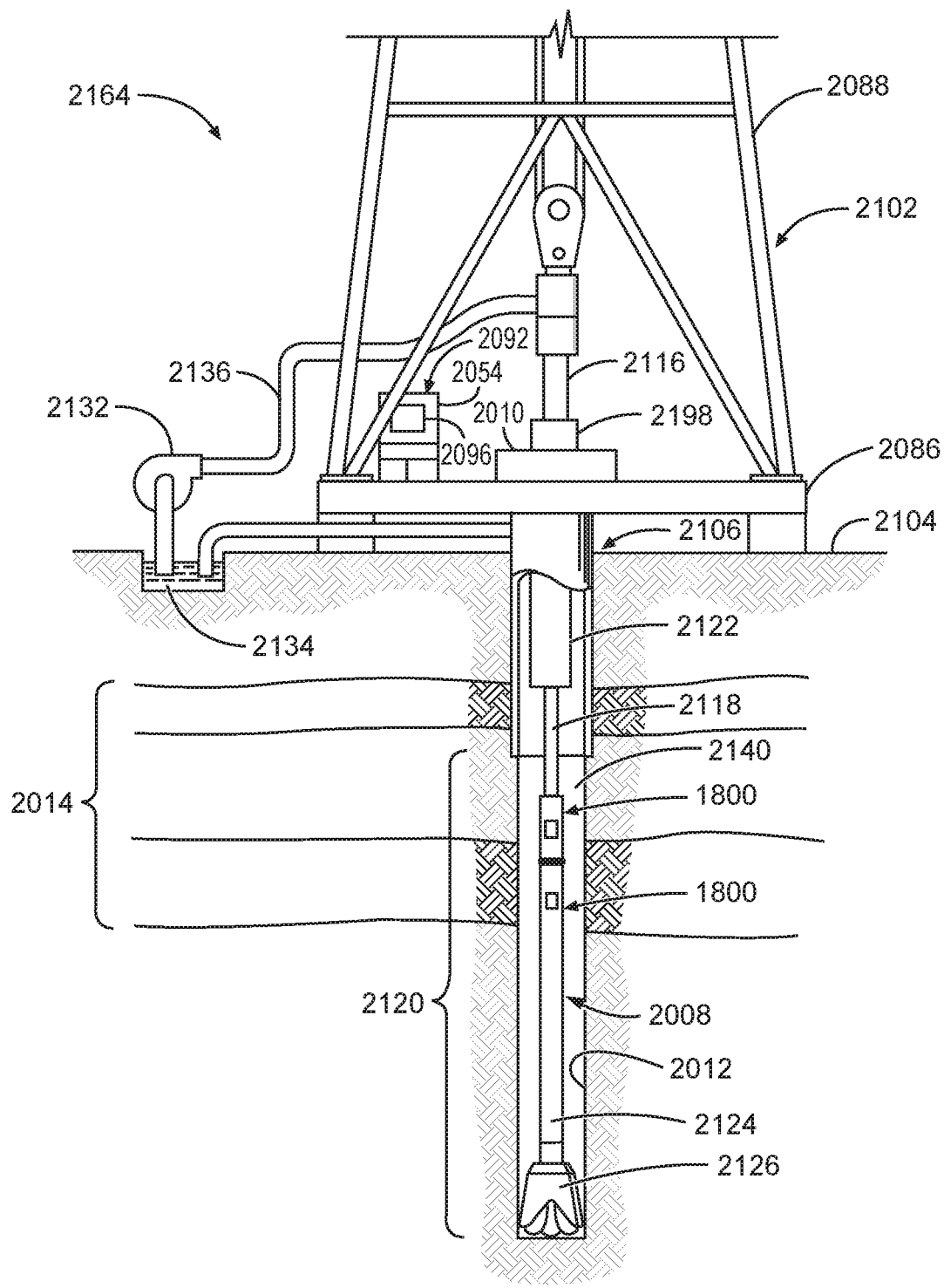
FIG. 21 illustrates a drilling rig system embodiment.

For example, FIG. 20 illustrates a wireline system embodiment. FIG. 21 illustrates a drilling rig system embodiment. Therefore, the systems 2064, 2164 may comprise portions of a wireline logging tool body 2070 as part of a wireline logging operation, or of a downhole tool 2124 as part of a downhole drilling operation. The systems 2064 and 2164 may include any one or more elements of the apparatus 1810 and systems 1800 shown in FIG. 18.

Thus, FIG. 20 shows a well during wireline logging operations. In this case, a drilling platform 2086 is equipped with a derrick 2088 that supports a hoist 2090.

Drilling oil and gas wells is commonly carried out using a string of drill pipes connected together so as to form a drilling string that is lowered through a rotary table 2010 into a wellbore or borehole 2012. Here it is assumed that the drilling string has been temporarily removed from the borehole 2012 to allow a wireline logging tool body 2070, such as a probe or sonde, to be lowered by wireline or logging cable 2074 into the borehole 2012. Typically, the wireline logging tool body 2070 is lowered to the bottom of the region of interest and subsequently pulled upward at a substantially constant speed.

During the upward trip, at a series of depths, various instruments included in the tool body 2070 may be used to perform measurements (e.g., made by the apparatus 1810 shown in FIG. 18) on the subsurface geological formations 2014 adjacent the borehole 2012 (and the tool body 2070). The borehole 2012 may represent one or more offset wells, or a target well.

The measurement data can be communicated to a surface logging facility 2092 for processing, analysis, and/or storage. The logging facility 2092 may be provided with electronic equipment for various types of signal processing, which may be implemented by any one or more of the components of the system 1800 in FIG. 18. Similar formation evaluation data may be gathered and analyzed during drilling operations (e.g., during logging while drilling operations, and by extension, sampling while drilling).

In some embodiments, the tool body 2070 is suspended in the wellbore by a wireline cable 2074 that connects the tool to a surface control unit (e.g., comprising a workstation 2054, which may have a display 2096). The tool may be deployed in the borehole 2012 on coiled tubing, jointed drill pipe, hard wired drill pipe, or any other suitable deployment technique.

Turning now to FIG. 21, it can be seen how a system 2164 may also form a portion of a drilling rig 2102 located at the surface 2104 of a well 2106. The drilling rig 2102 may provide support for a drill string 2108. The drill string 2108 may operate to penetrate the rotary table 2010 for drilling the borehole 2012 through the subsurface formations 2014. The drill string 21.08 may include a Kelly 2116, drill pipe 2118, and a bottom hole assembly 2120, perhaps located at the lower portion of the drill pipe 2118.

The bottom hole assembly 2120 may include drill collars 2122, a downhole tool 2124, and a drill bit 2126. The drill bit 2126 may operate to create the borehole 2012 by penetrating the surface 2104 and the subsurface formations 2014. The downhole tool 2124 may comprise any of a number of different types of tools including measurement while drilling tools, logging while drilling tools, and others.

During drilling operations, the drill string 2108 (perhaps including the Kelly 2116, the drill pipe 2118, and the bottom hole assembly 2120) may be rotated by the rotary table 2010. Although not shown, in addition to, or alternatively, the bottom hole assembly 2120 may also be rotated by a motor (e.g., a mud motor) that is located downhole. The drill collars 2122 may be used to add weight to the drill bit 2126. The drill collars 2122 may also operate to stiffen the bottom hole assembly 2120, allowing the bottom hole assembly 2120 to transfer the added weight to the drill bit 2126, and in turn, to assist the drill bit 2126 in penetrating the surface 2104 and subsurface formations 2014.

During drilling operations, a mud pump 2132 may pump drilling fluid (sometimes known by those of ordinary skill in the art as "drilling mud") from a mud pit 2134 through a hose 2136 into the drill pipe 2118 and down to the drill bit 2126. The drilling fluid can flow out from the drill bit 2126 and be returned to the surface 2104 through an annular area between the drill pipe 2118 and the sides of the borehole 2012. The drilling fluid may then be returned to the mud pit 2134, where such fluid is filtered. In some embodiments, the drilling fluid can be used to cool the drill bit 2126, as well as to provide lubrication for the drill bit 2126 during drilling operations. Additionally, the drilling fluid may be used to remove subsurface formation cuttings created by operating the drill bit 2126.

Thus, referring now to FIGS. 2-3, 18, and 20-21, it may be seen that in some embodiments, the systems 2064, 2164 may include a drill collar 2122, a downhole tool 2124, and/or a wireline logging tool body 2070 to house any or all components of a system 1800, including one or more apparatus 1810, similar to or identical to the apparatus 1810 described above and illustrated in FIG. 18, The tool 2124 may comprise a downhole tool, such as a logging while drilling (LWD) tool or a measurement while drilling (MWD) tool. The wireline tool body 2070 may comprise a wireline logging tool, including a probe or sonde, for example, coupled to a logging cable 2074. Many embodiments may thus be realized. For example, in some embodiments, a system 2064, 2164. may include a display 2096 to present resistivity image data in a well, including associated inversion results, perhaps in graphic form. Formation and/or cement density and structure may also be displayed. Many other embodiments may be realized, some of these will now be listed as non-limiting examples.

In some embodiments, a method comprises detecting anomalous formation resistivity values within measured formation resistivity data, based on mud resistivity associated with a borehole in a geological formation, the measured formation resistivity data comprising the anomalous formation resistivity values and acceptable formation resistivity values. The method may further include transforming the anomalous formation resistivity values into corrected formation resistivity values, inverting the corrected formation resistivity values and the acceptable formation resistivity values to provide true resistivity values for a geological formation, and operating a controlled device according to the true resistivity values for the geological formation.

Some embodiments of the method further comprise detecting anomalous borehole-corrected apparent resistivity values within borehole-corrected apparent resistivity data derived from the measured formation resistivity data, and transforming the anomalous borehole-corrected apparent resistivity values into corrected versions of the borehole-corrected apparent resistivity values, based on resistivity separation thresholds and a weighted transition function.

In some embodiments, operating the controlled device further comprises controlling drilling operations in the geological formation based on the true resistivity values.

In some embodiments, operating the controlled device further comprises publishing at least some of the true resistivity values for the geological formation in a human-readable form.

In some embodiments, detecting the anomalous formation resistivity values comprises identifying the anomalous formation resistivity values as values in the measured formation resistivity data that are bounded by an upper caving threshold and a lower caving threshold.

In some embodiments, transforming the anomalous formation resistivity values comprises calculating weighting vectors to be applied to the anomalous formation resistivity values to provide the corrected formation resistivity values, the weighting vectors to be determined according to a transition function. In some embodiments, the transition function is one of a linear transition function or a logarithmic transition function.

Some embodiments of the method comprise designating one of a plurality of measurement modes associated with a laterolog tool as a deepest mode to be associated with the transforming, and refraining from the transforming for values of the measured resistivity data associated with the plurality of measurement modes that are deeper than the deepest mode.

In some embodiments, a method comprises detecting anomalous borehole-corrected apparent resistivity values within borehole-corrected apparent resistivity data, based on apparent resistivity separation associated with a borehole in a geological formation, the borehole-corrected apparent resistivity data comprising the anomalous borehole-corrected apparent resistivity values and acceptable borehole-corrected apparent resistivity values. In some embodiments, the method further comprises transforming the anomalous borehole-corrected apparent resistivity values into corrected versions of the borehole-corrected apparent resistivity values, in an order determined by depth of the measured formation resistivity data; inverting the corrected versions of the borehole-corrected apparent resistivity values and the acceptable borehole-corrected apparent resistivity values to provide true resistivity values for a geological formation; and operating a controlled device according to the true resistivity values for the geological formation.

In some embodiments, the method further comprises obtaining measured resistivity data from the geological formation during drilling operations, wherein the borehole-corrected apparent resistivity data is to be derived from the measured resistivity data; and inverting the measured formation resistivity data to correct for borehole effects, to obtain the borehole-corrected apparent resistivity data.

In some embodiments, operating the controlled device further comprises controlling a bit steering device to select a drilling direction in the geological formation based on the true resistivity values for the geological formation.

In some embodiments, operating the controlled device further comprises publishing at least some of the true resistivity values for the geological formation in a human-readable form.

In some embodiments, detecting the anomalous borehole-corrected apparent resistivity values comprises identifying the anomalous borehole-corrected apparent resistivity values as values in the borehole-corrected apparent resistivity data that are bounded by an upper separation threshold and a lower separation threshold.

In some embodiments, transforming the anomalous formation resistivity values comprises calculating weighting vectors to be applied to the anomalous borehole-corrected apparent resistivity values to provide the corrected versions of the borehole-corrected apparent resistivity values, the weighting vectors to be determined according to a logarithmic function of the upper and lower separation thresholds.

In some embodiments, transforming the anomalous formation resistivity values comprises calculating a first group of weighting vectors to be applied to some of the anomalous borehole-corrected apparent resistivity values to provide a first group of the corrected versions of the borehole-corrected apparent resistivity values; and calculating a second group of weighting vectors to be applied to a remaining number of the anomalous borehole-corrected apparent resistivity values, using the first group of the corrected versions of the borehole-corrected apparent resistivity values, to generate a second group of the corrected versions of the borehole-corrected apparent resistivity values.

In some embodiments, the method further comprises inverting measured formation resistivity data to correct for borehole effects, to obtain the borehole-corrected apparent resistivity data; detecting anomalous formation resistivity values within the measured formation resistivity data, based on mud resistivity associated with the borehole in the geological formation; and transforming the anomalous formation resistivity values into corrected formation resistivity values.

In some embodiments, a system comprises at least one tool to measure resistivity in a borehole associated with a geological formation as measured formation resistivity data; and a processing unit coupled to the at least one tool to receive the measured formation resistivity data, the processing unit to operate to transform anomalous formation resistivity values within the measured formation resistivity data into corrected formation resistivity values based on mud resistivity in the borehole, to transform anomalous borehole-corrected apparent resistivity values derived from the measured formation resistivity data to provide corrected versions of the borehole-corrected apparent resistivity data based on apparent resistivity separation, and to invert the corrected formation resistivity values and the corrected versions of the borehole-corrected apparent resistivity data to determine true resistivity values for the geological formation.

In some embodiments, a system comprises a bit steering device to operate in response to the true resistivity values determined by the processing unit, to control drilling operations in the geological formation.

In some embodiments, the at least one tool comprises an array laterolog tool.

In some embodiments, a system comprises a monitor to indicate transitions from invaded to non-invaded regions of the geological formation, based on the true resistivity values determined by the processing unit.

In summary, the apparatus, systems, and methods disclosed operate to employ novel processes to identify and correct shallow measurement data, acquired by a resistivity or induction tool, which has been corrupted by the presence of caving effects. The processes introduced herein are easily implemented—they are fast and accurate. Moreover, they can be introduced without acquiring any information other than what is already available via conventional measurements processes. As a result, the value of services provided by an operation exploration company may be significantly enhanced.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   measuring formation resistivity values associated with a plurality of depths of investigation of a resistivity tool;
   designating one of a plurality of measurement modes associated with the plurality of depths of investigation as a deepest mode; and
   for each of the plurality of depths of investigation that are shallower than a depth of investigation corresponding to the designated deepest mode, detecting an anomalous formation resistivity value within measured formation resistivity values, based on a mud resistivity associated with a borehole in a geological formation, correcting the anomalous formation resistivity value, based at least partly on the depth of investigation, to generate a corrected formation resistivity value, and determining true resistivity values for the geological formation based, at least partly, on the depth of investigation.

2. The method according to claim 1, further comprising operating a controlled device according to the true resistivity values for the geological formation, wherein operating the controlled device comprises:
   controlling drilling operations in the geological formation based on the true resistivity values; and
   publishing at least some of the true resistivity values for the geological formation in a human-readable form.

3. The method according to claim 1, wherein detecting the anomalous formation resistivity value comprises:
   identifying the anomalous formation resistivity value as a value in the measured formation resistivity values that is bounded by an upper caving threshold and a lower caving threshold which define a first correction range.

4. The method according to claim 1, wherein correcting the anomalous formation resistivity value comprises:
   calculating a weighting vector to be applied to the anomalous formation resistivity value to provide the corrected formation resistivity value, the weighting vector to be determined according to a transition function between a first correction range and a second correction range corresponding to the depths of investigation.

5. The method according to claims 4, wherein the transition function is one of a linear transition function or a logarithmic transition function.

6. The method according to claim 1, further comprising:
   for each depth of investigation, detecting an anomalous borehole-corrected apparent resistivity value within borehole-corrected apparent resistivity values, wherein the borehole-corrected apparent resistivity values are derived from the measured formation resistivity values; and
   correcting the anomalous borehole-corrected apparent resistivity value into a corrected version of the borehole-corrected apparent resistivity value, based on a resistivity separation threshold and a weighted transition function.

7. The method of claim 1, wherein a first depth of investigation is shallow with respect to a second depth of investigation of the plurality of depths of investigation.

8. A method, comprising:
   obtaining borehole-corrected apparent resistivity values from measured resistivity values associated with a plurality of depths of investigation of a resistivity tool;

designating one of a plurality of measurement modes associated with the plurality of depths of investigation as a deepest mode; and for each of the plurality of depths of investigation that are shallower than a depth of investigation corresponding to the designated deepest mode, detecting anomalous borehole-corrected apparent resistivity values within the borehole-corrected apparent resistivity values, based on apparent resistivity separation associated with a borehole in a geological formation, correcting the anomalous borehole-corrected apparent resistivity values, based at least partly on the depth of investigation, to generate corrected versions of the borehole-corrected apparent resistivity values, in an order determined by the depth of investigation of the measured formation resistivity values, and determining true resistivity values for the geological formation based, at least in part, on the corrected versions of the borehole-corrected apparent resistivity values.

9. The method according to claim 8, further comprising operating a controlled device according to the true resistivity values for the geological formation, wherein operating the controlled device comprises:

controlling a bit steering device to select a drilling direction in the geological formation based on the true resistivity values for the geological formation; and publishing the true resistivity values for the geological formation in a human-readable form.

10. The method according to claim 8, wherein detecting the anomalous borehole-corrected apparent resistivity values comprises:

identifying the anomalous borehole-corrected apparent resistivity values as values in the borehole-corrected apparent resistivity values that are bounded by an upper separation threshold and a lower separation threshold corresponding to the depth of investigation.

11. The method according to claim 10, wherein correcting the anomalous borehole-corrected apparent resistivity values comprises:

calculating weighting vectors to be applied to the anomalous borehole-corrected apparent resistivity values to provide the corrected versions of the borehole-corrected apparent resistivity values, the weighting vectors to be determined according to a logarithmic function of the upper and lower separation thresholds.

12. The method according to claim 8, wherein correcting the anomalous borehole-corrected apparent resistivity values comprises:

calculating a first group of weighting vectors to be applied to some of the anomalous borehole-corrected apparent resistivity values to provide a first group of the corrected versions of the borehole-corrected apparent resistivity values; and calculating a second group of weighting vectors to be applied to a remaining number of the anomalous borehole-corrected apparent resistivity values, using the first group of the corrected versions of the borehole-corrected apparent resistivity values, to generate a second group of the corrected versions of the borehole-corrected apparent resistivity values.

13. The method according to claim 8, further comprising:

measuring the resistivity values associated with different depths of investigation of the resistivity tool; and inverting the measured formation resistivity values to correct for borehole effects, to obtain the borehole-corrected apparent resistivity values.

14. The method according to claim 8, wherein detecting the anomalous borehole-corrected apparent resistivity values within borehole-corrected apparent resistivity values further comprises:

detecting anomalous formation resistivity values within the measured formation resistivity values, wherein detecting the anomalous formation resistivity values comprises determining that the anomalous formation resistivity values scaled by a mud resistivity value are within a correction range corresponding to one of a plurality of measurement modes of the resistivity tool;

correcting the anomalous formation resistivity values based, at least in part, on the one of the plurality of measurement modes to generate corrected formation resistivity values; and inverting the corrected anomalous formation resistivity values to correct for borehole effects, to obtain the borehole-corrected apparent resistivity values.

15. The method of claim 8, wherein a first of the plurality of depths of investigation is shallow with respect to a second of the plurality of depths of investigation.

16. A system comprising:

a resistivity tool;

a processor coupled to the resistivity tool; and a computer-readable medium having instructions stored thereon that are executable by the processor to cause the system to, measure, with the resistivity tool, resistivities of a borehole associated with a geological formation during;

determine a depth of investigation associated with each of the measured resistivities, wherein the depth of investigation is one of a plurality of depths of investigation, each of the plurality of depths of investigation associated with a different depth of measurement of the resistivity tool;

designate one of a plurality of measurement modes associated with the plurality of depths of investigation as a deepest mode; and for each of the plurality of depths of investigation that are shallower than a depth of investigation corresponding to the designated deepest mode, detect anomalous resistivity values within the measured resistivities, wherein the instructions to detect the anomalous resistivity values comprise instructions executable by the processor to cause the system to determine whether a measured resistivity is within a correction range corresponding to the depth of investigation associated with the measured resistivity, correct the anomalous formation resistivity values based, at least in part, on the correction range to generate corrected resistivity values, and determine true resistivity values for the geological formation based, at least in part, on the corrected resistivity values.

17. The system of claim 16, wherein the measured resistivities are formation resistivities, and the instructions to detect anomalous resistivity values comprise instructions to scale the formation resistivities by a mud resistivity value.

18. The system of claim 16, wherein the measured resistivities are apparent resistivities, and the instructions to detect anomalous resistivity values comprise instructions to scale the apparent resistivities by an apparent resistivity separation value.

19. The system of claim 16, wherein the resistivity tool is a laterolog resistivity tool.

* * * * *